Aug. 11, 1925.
G. A. SMITH
1,549,052
BOX STUFF ASSORTING AND ASSEMBLING MACHINE
Filed Nov. 7, 1924    14 Sheets-Sheet 1
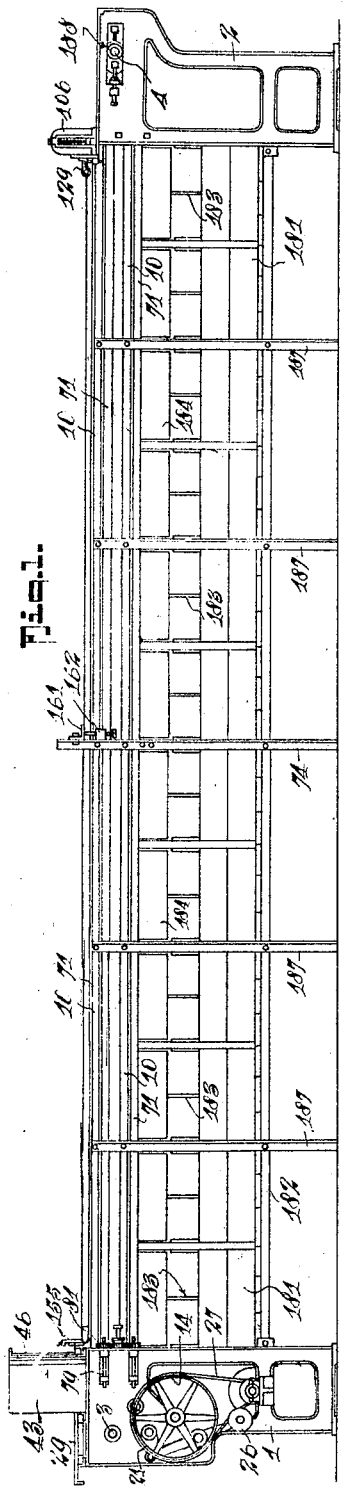
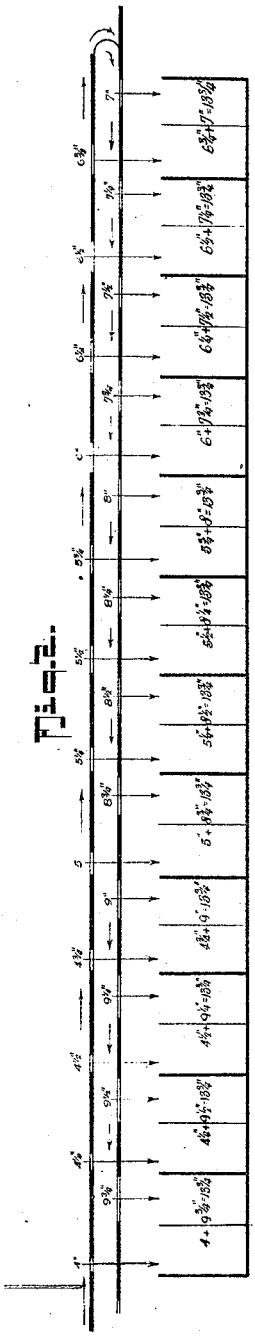
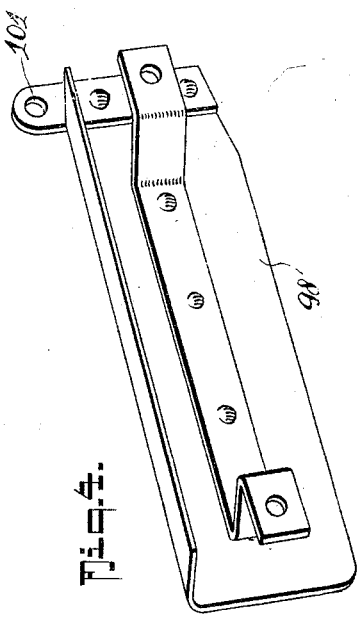
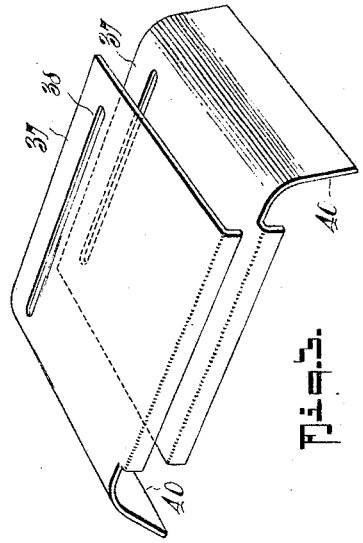
INVENTOR
George A. Smith.
BY
Albert E. Dieterich
ATTORNEY

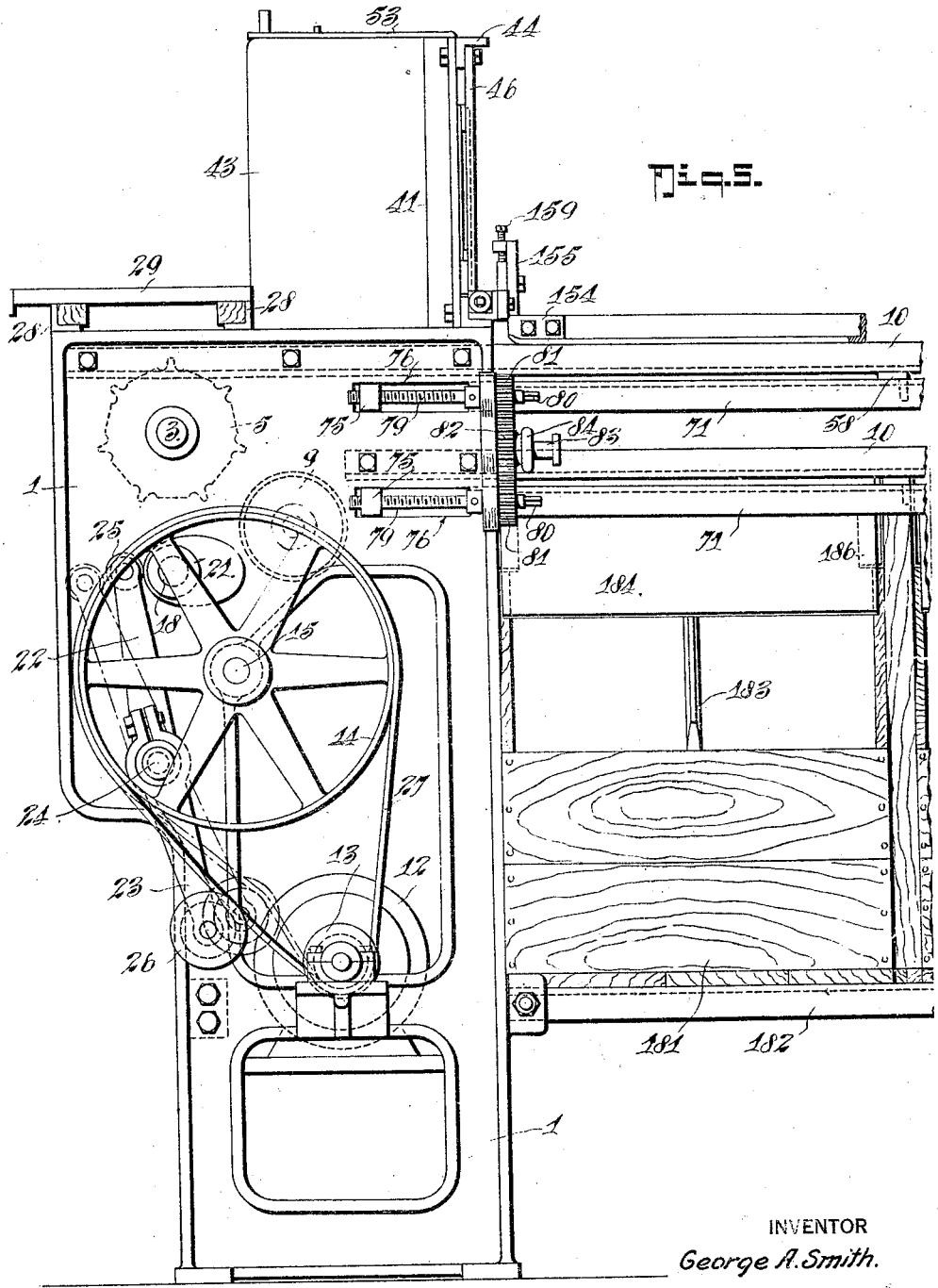

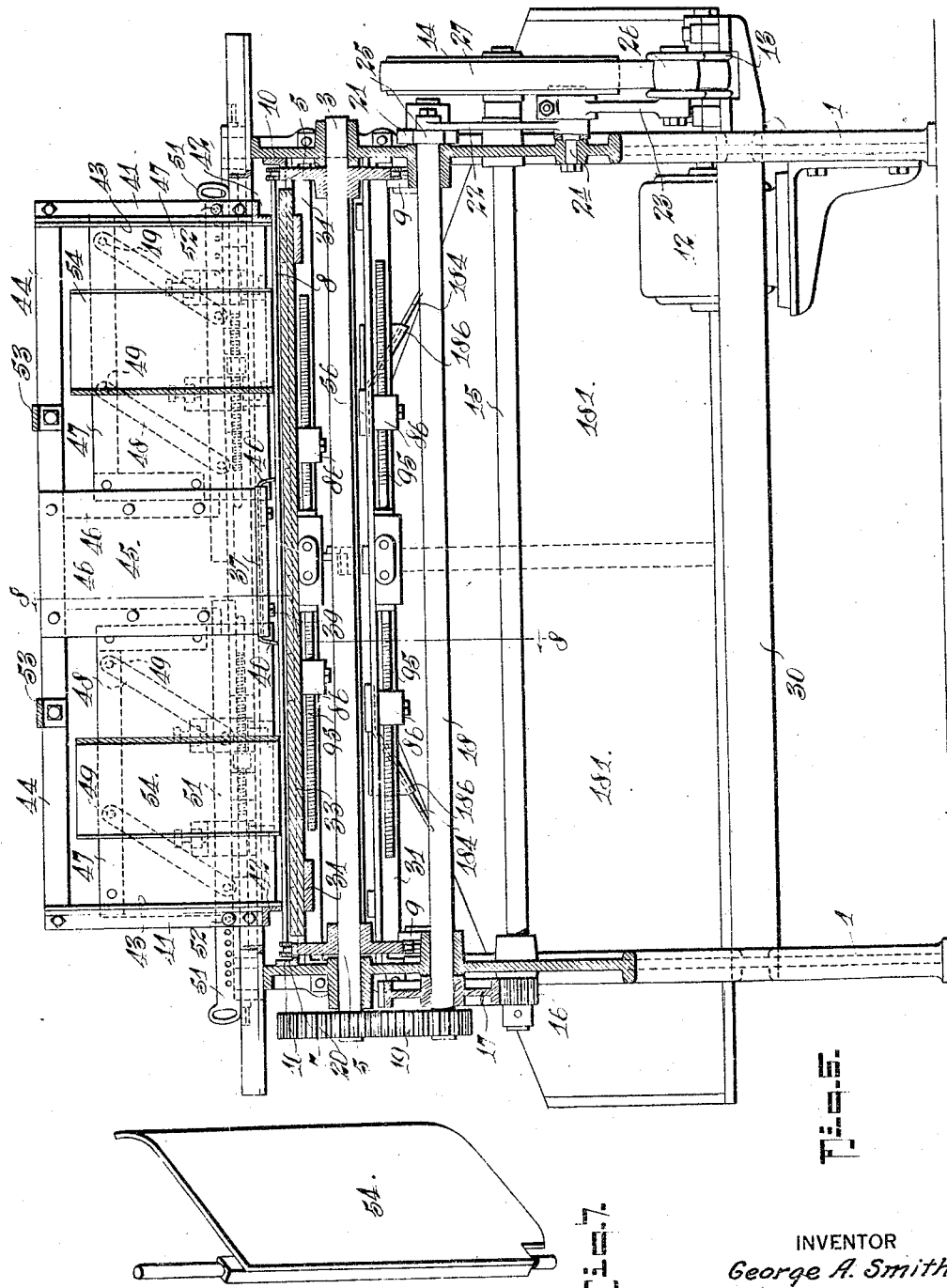

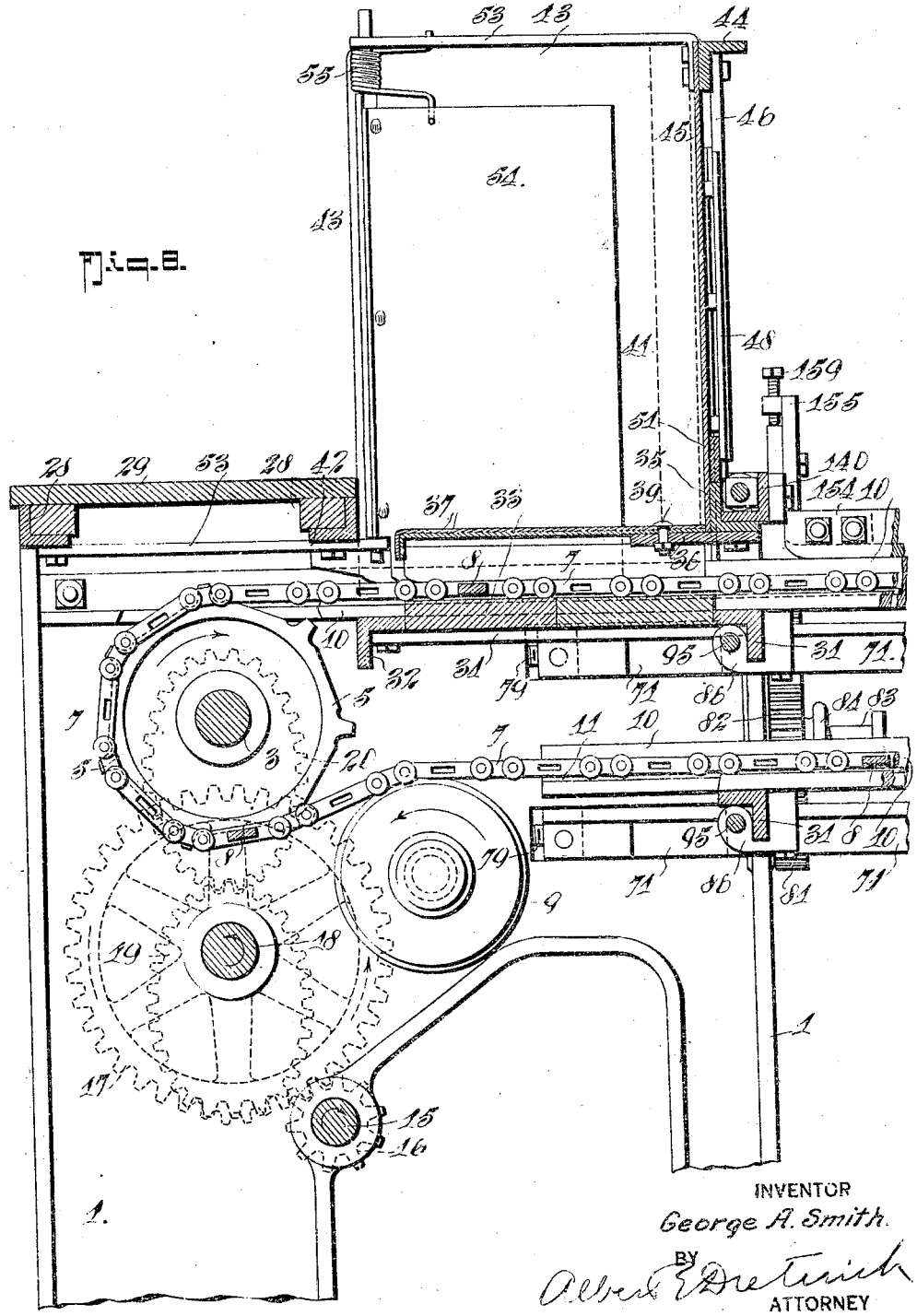

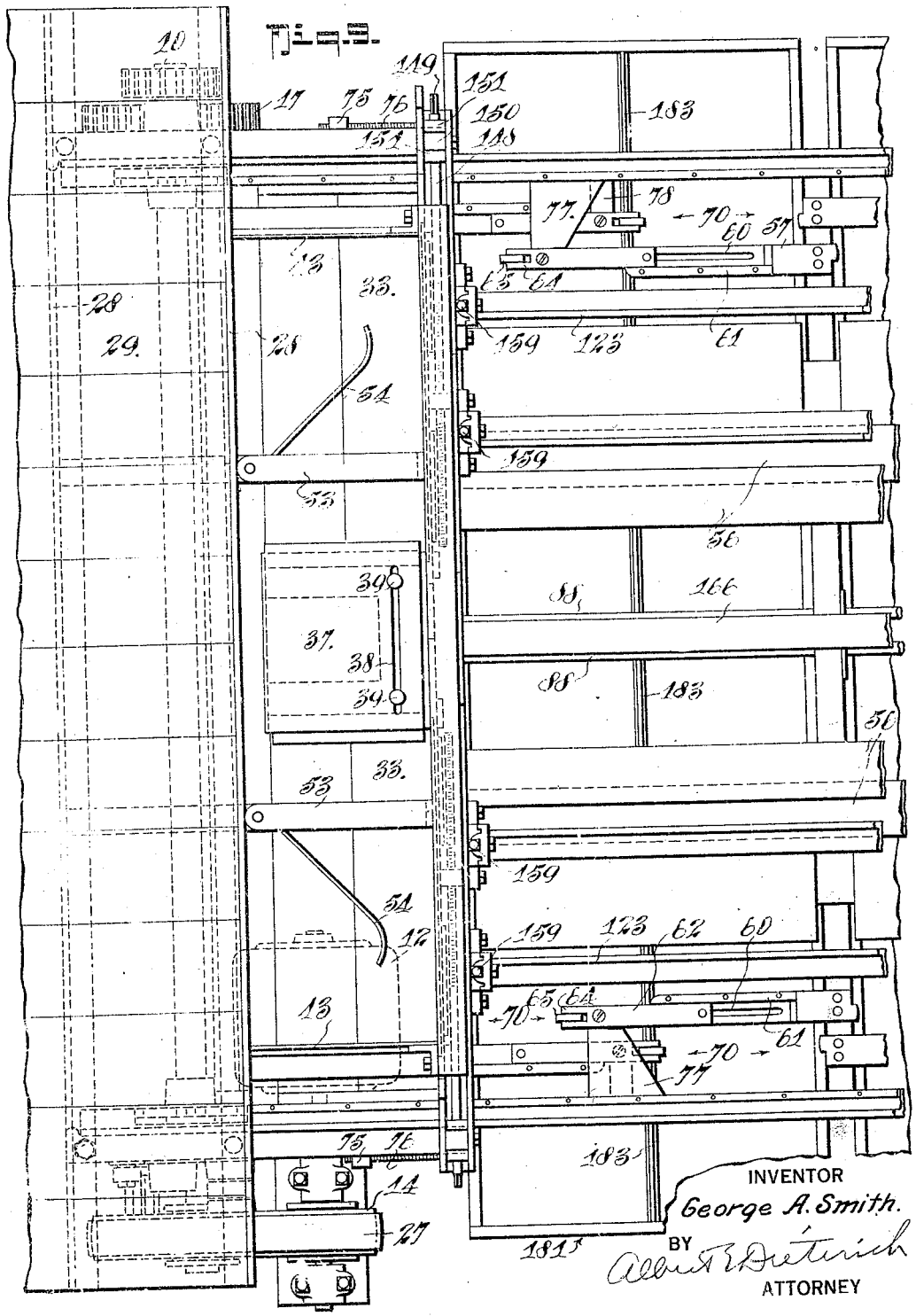

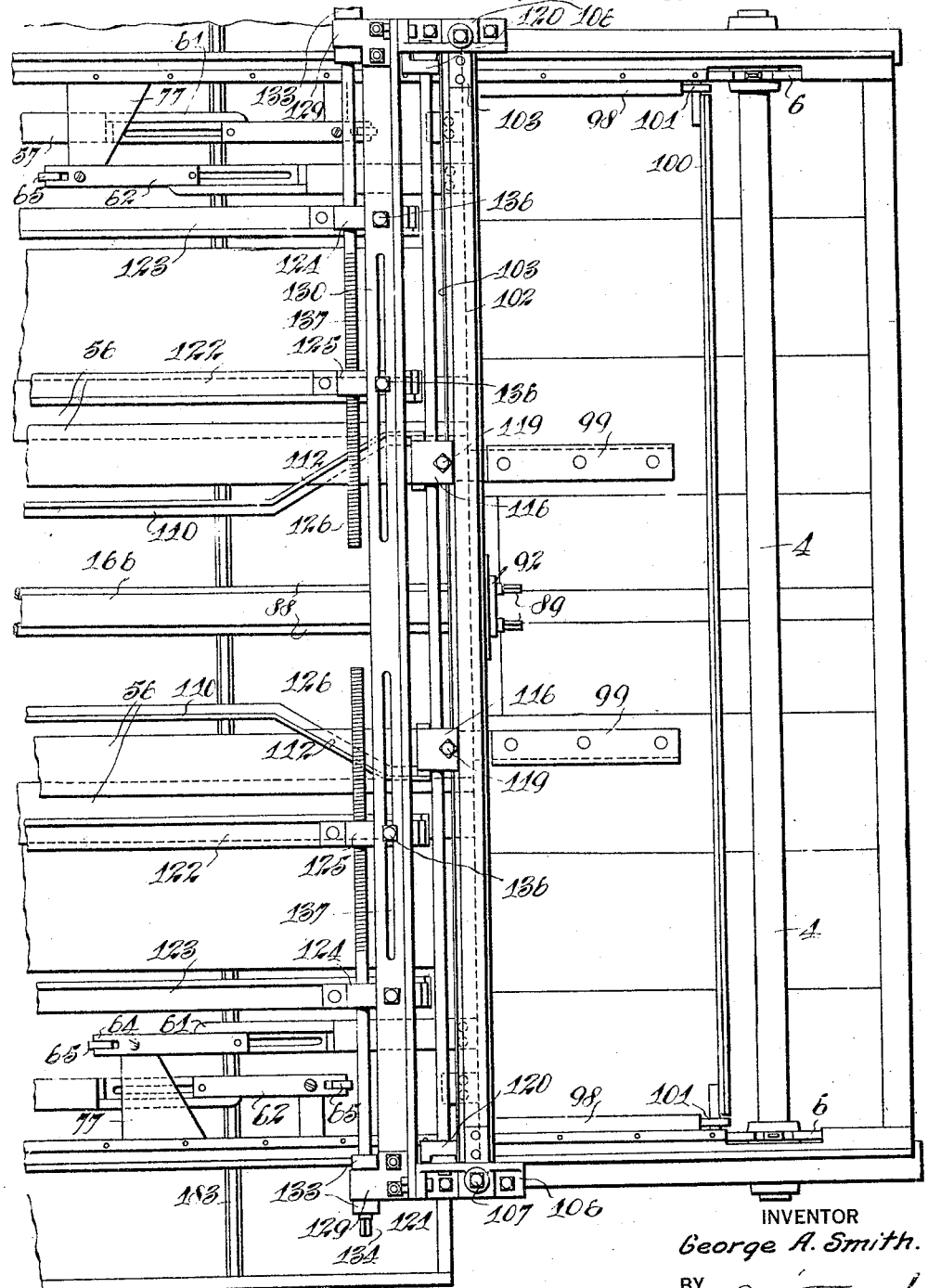

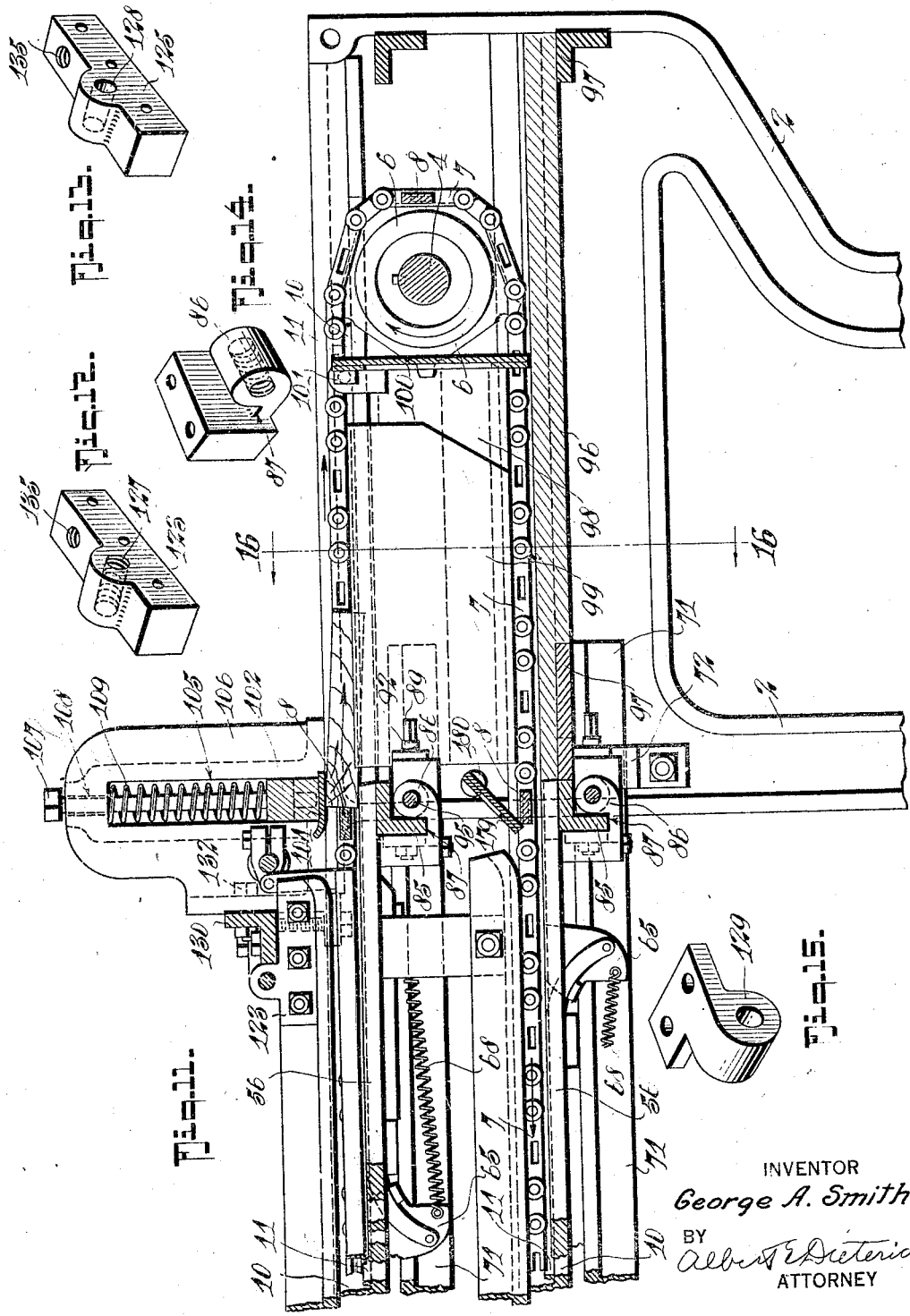

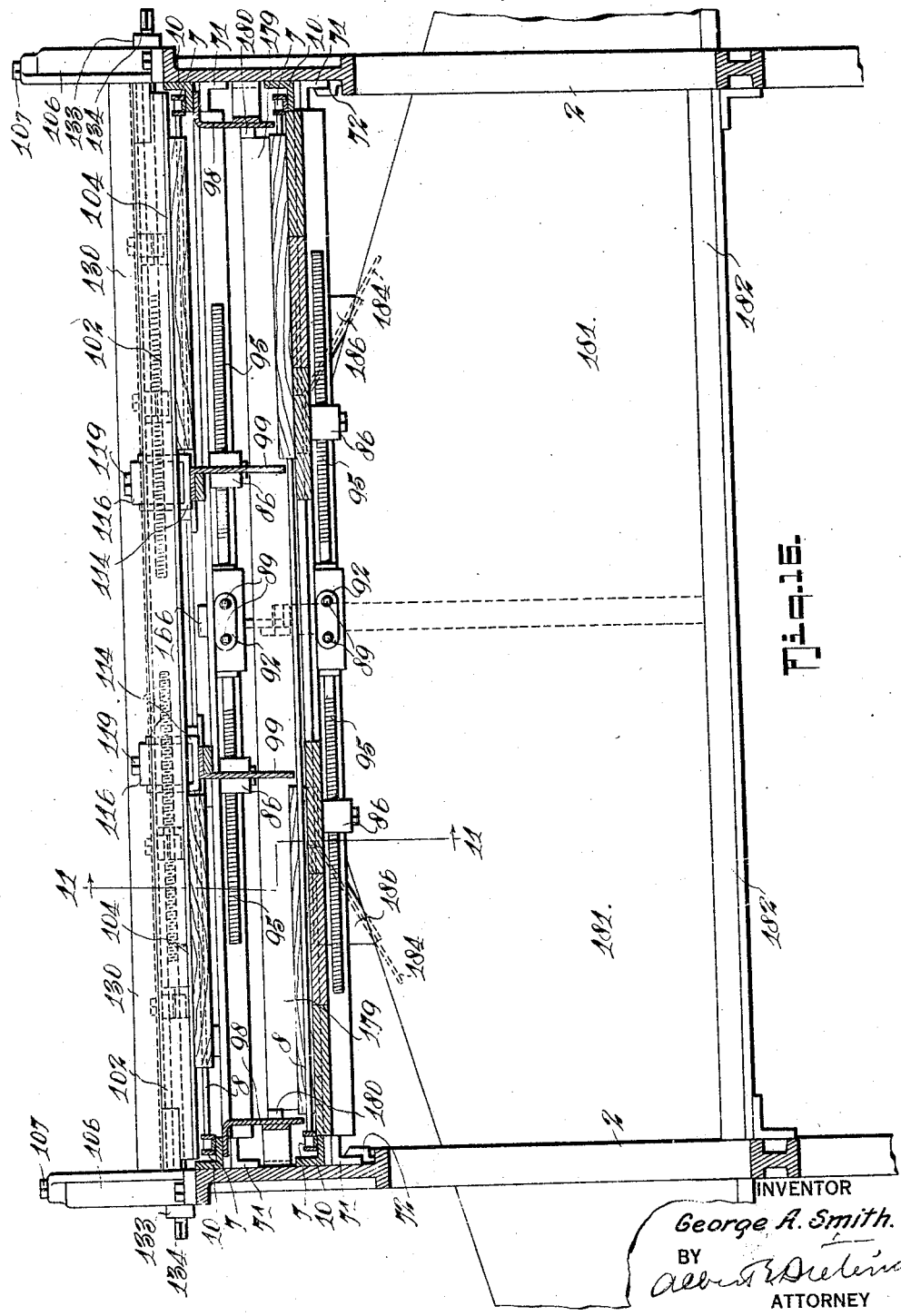

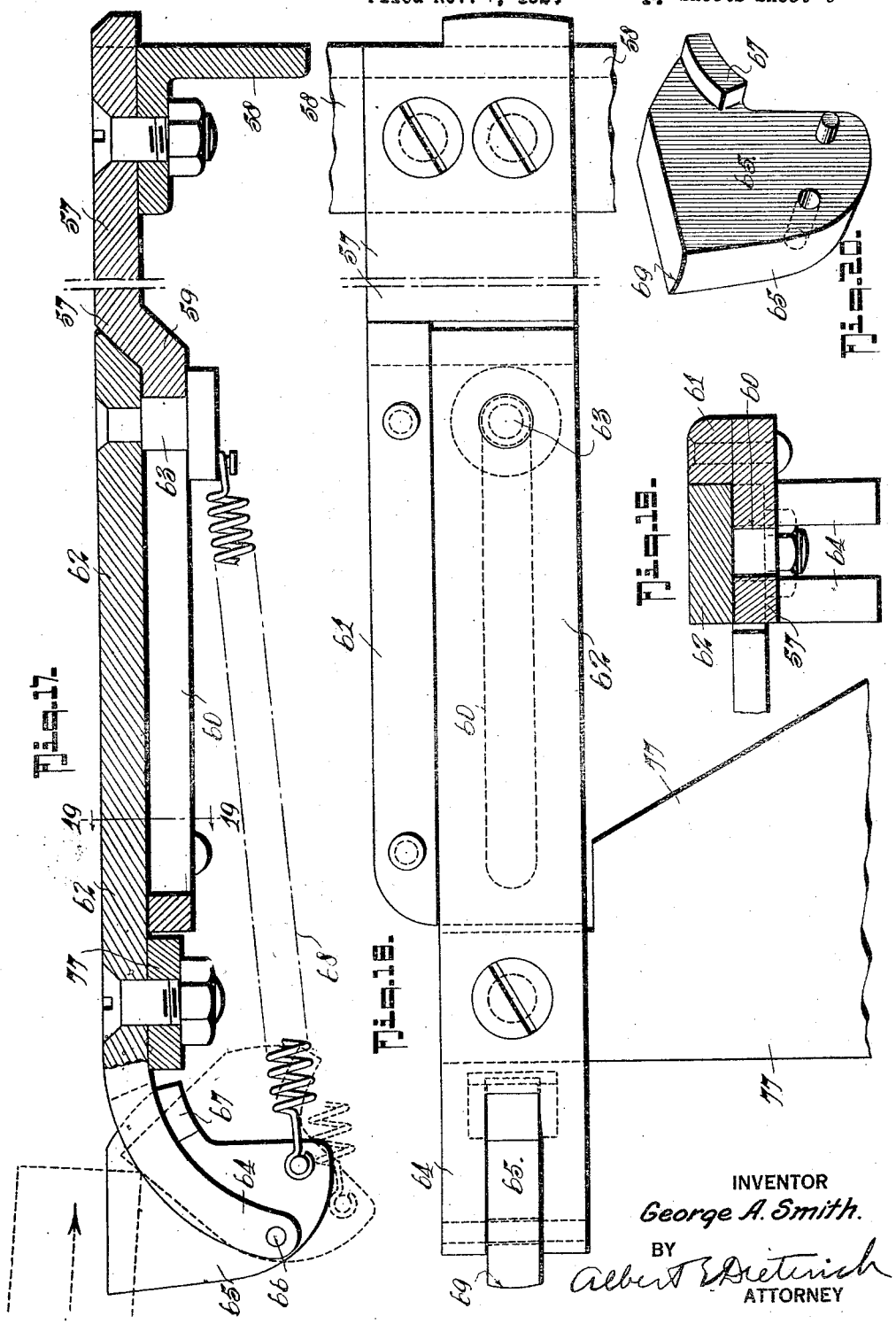

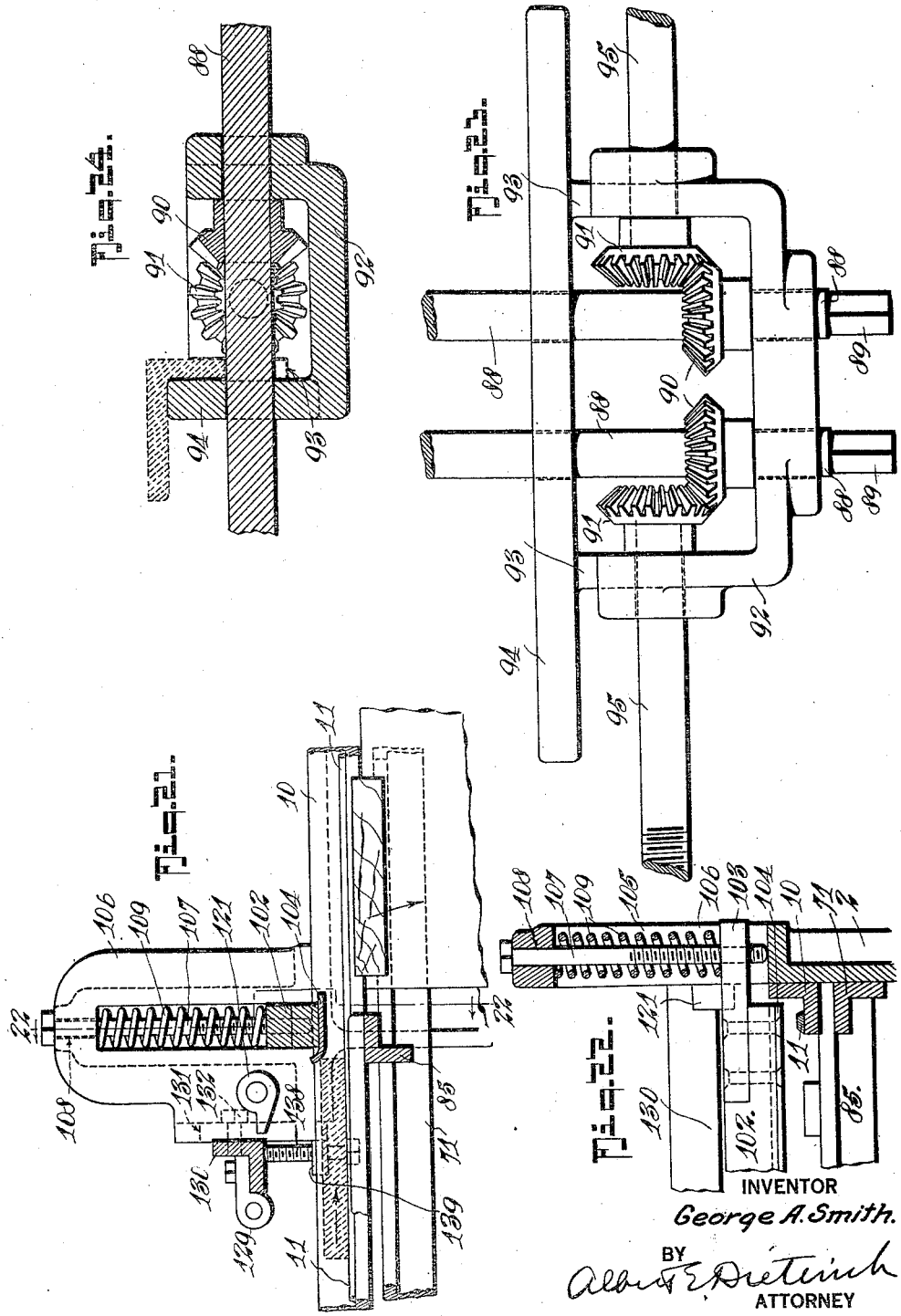

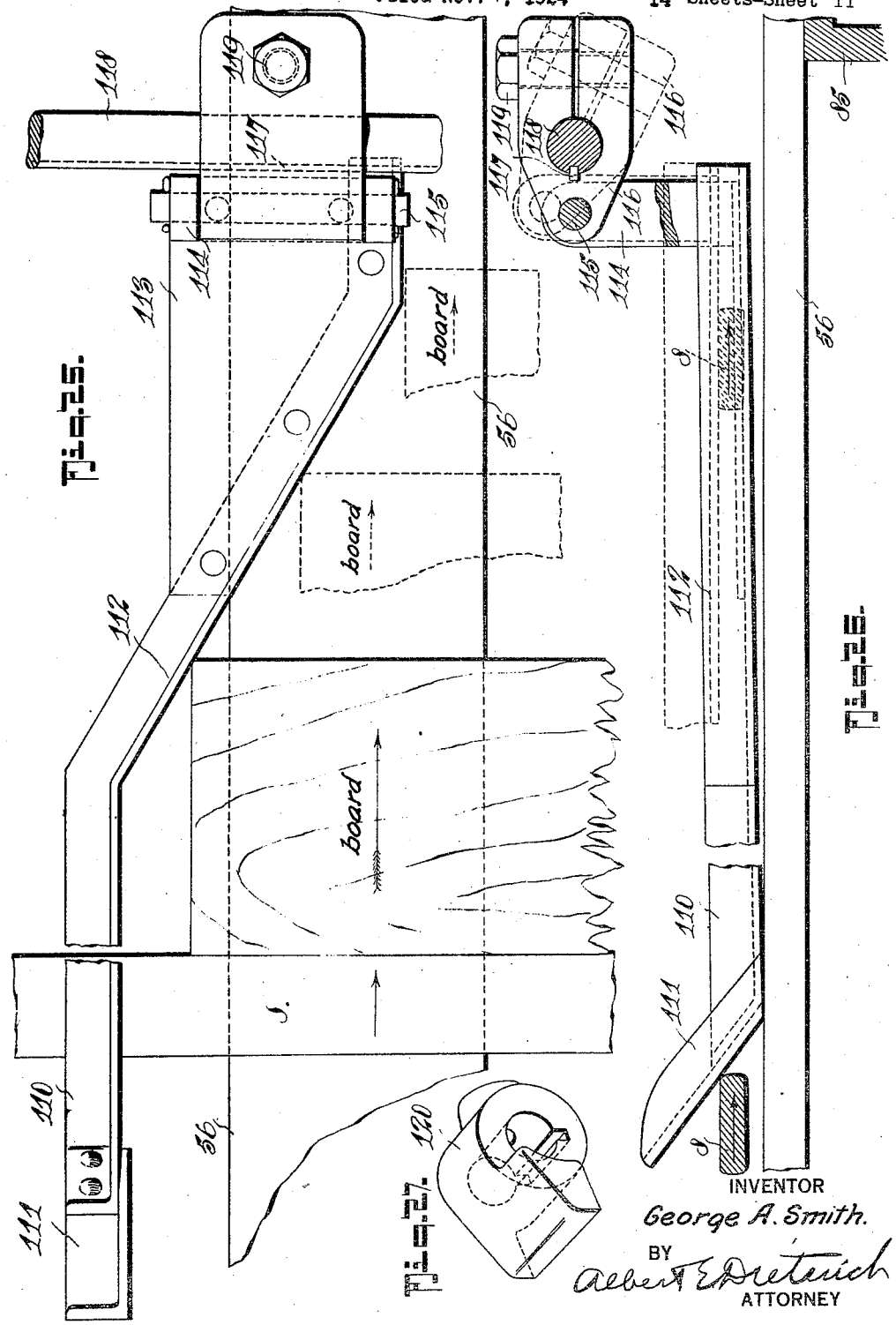

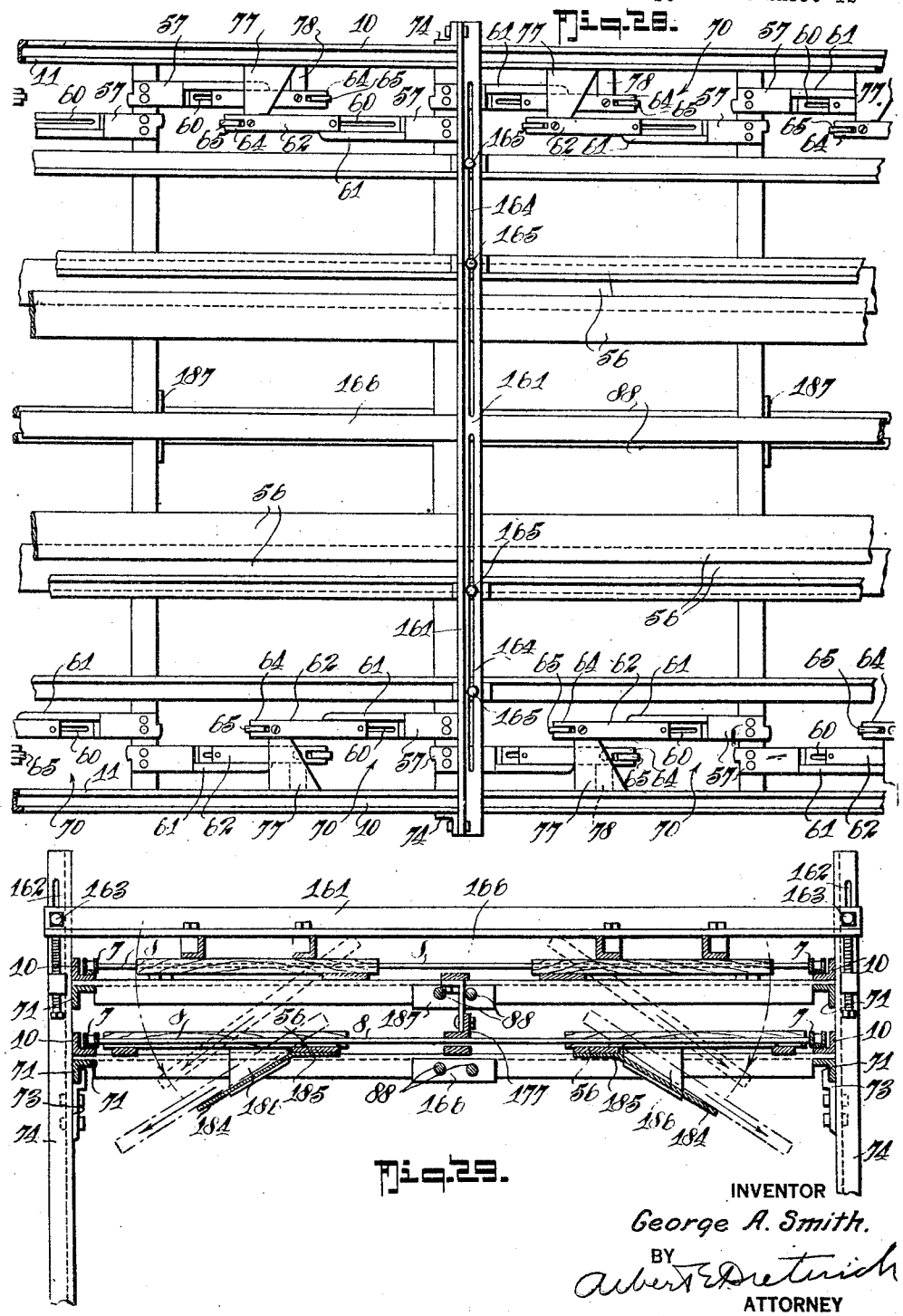

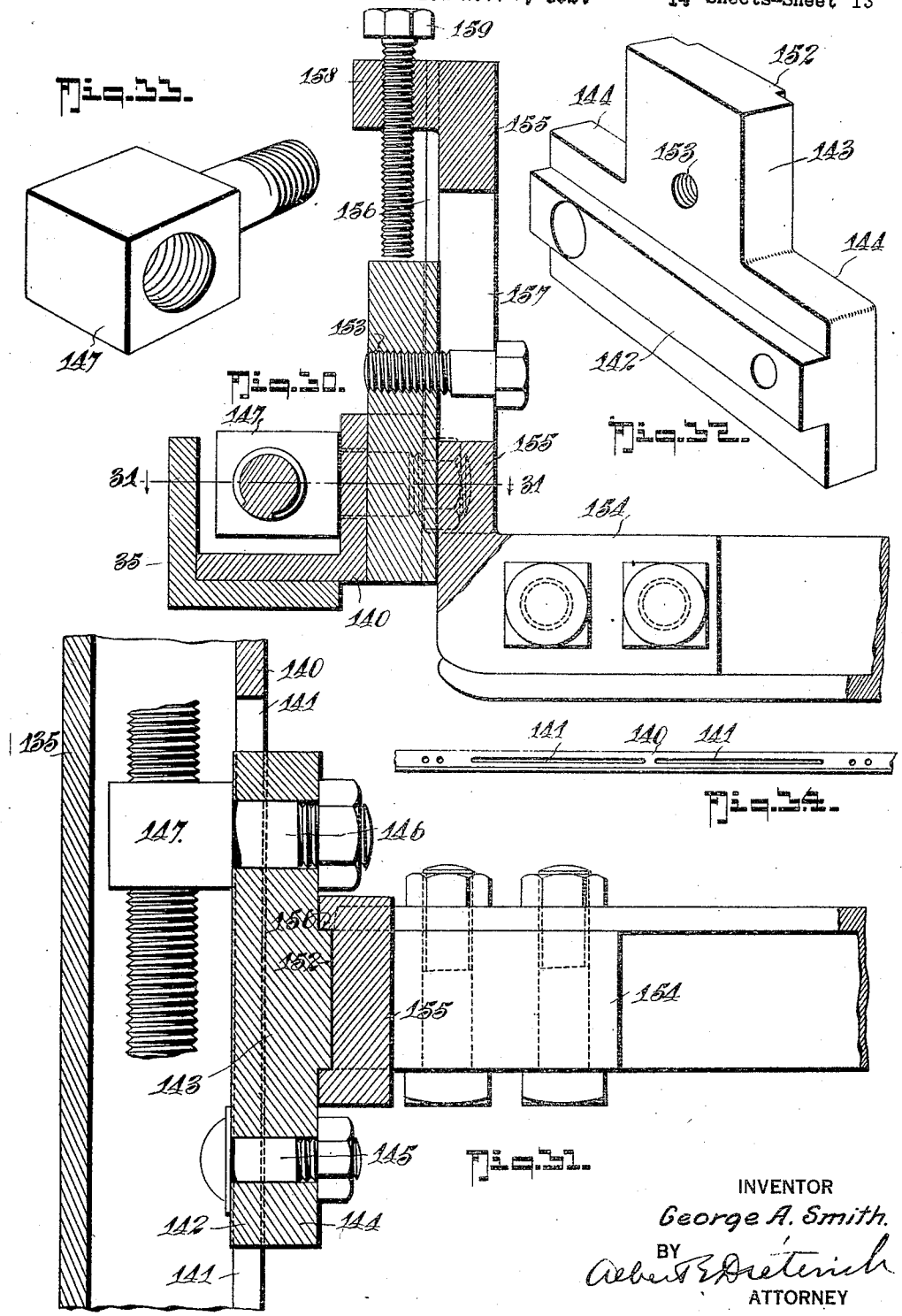

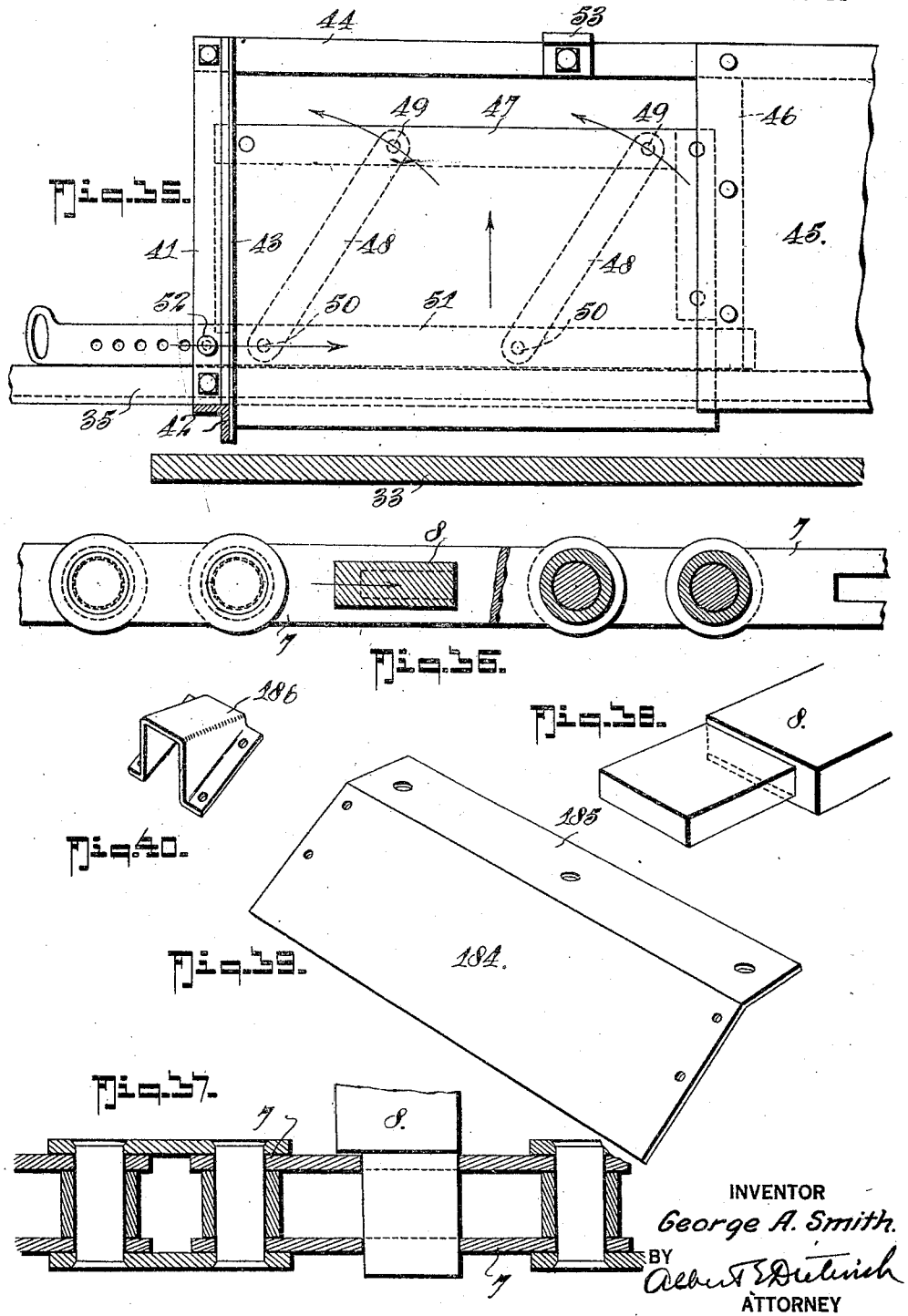

Patented Aug. 11, 1925.

1,549,052

UNITED STATES PATENT OFFICE.

GEORGE ANDREWS SMITH, OF SOUTH HILL, VIRGINIA.

BOX-STUFF ASSORTING AND ASSEMBLING MACHINE.

Application filed November 7, 1924. Serial No. 748,508.

*To all whom it may concern:*

Be it known that I, GEORGE A. SMITH, a citizen of the United States, residing at South Hill, in the county of Mecklenburg and State of Virginia, have invented certain new and useful Improvements in Box-Stuff Assorting and Assembling Machines, of which the following is a specification.

Generically the invention seeks to provide a relatively compact, relatively inexpensive, and practical mechanism, simple of operation and positive in its action in effecting the assorting, into predetermined standard widths, and the assembling, into predetermined combinations of standard widths, of box stuff or shooks.

As is will known to those familiar with the manufacture of packing box forms, i. e., the side, top, bottom and end units, assembled as such for nailing, or for shipment before nailing, it is necessary that the shooks composing such forms be properly cut and dressed and matched to standard widths and that such standard widths be assorted into piles of like widths and that such assorted widths be assembled with such other assorted standard widths as will combine in making the desired box form "aggregate width". As for example, the combination of an 8 inch standard width shook with a 6 inch standard width, or the combination of a 9 inch standard width shook with a 5 inch standard width shook for forming a 14 inch "aggregate width" box form. Heretofore it has been necessary that all such assortment and assembly be made by hand, in order to be properly effective, thereby increasing the necessary cost per box form and diminishing the possible output of the industry.

Therefore, more specifically, the invention resides in the provision of a machine for receiving or for being fed with miscellaneous standard width box shooks and for accurately assorting like widths of said shooks into compartments provided therefor and in such a manner as to place into immediately adjacent relation such combinations of shook widths as will assemble to provide the particular "aggregate width" of box form for which the machine was set at the start of operation thereof.

In its more detailed nature, the invention consists of supporting framework, an operating table, miscellaneous sized shook receiving hoppers, shook passage controlling gates, endless shook conveyors, mechanism for driving said conveyors with an increasing and diminishing speed action, means for compensating for the change of speed and power as relates to the danger of breakage of parts, adjustable upper and lower interrupted and continuous trackways, box shook drops in said interrupted trackways, main and supplemental shook receiving compartments under said drops, means for preventing displacement of the box shooks in course of travel, means for shifting the traveling box shooks from alignment with upper trackways to alignment with lower trackways, and means for insuring the proper dropping of the box shooks at proper times.

With the above and other objects in view which will hereinafter appear, the invention resides in those novel details of construction, combination and arrangement of parts, all of which will be first fully described, then be particularly pointed out in the appended claims and illustrated in the accompanying drawings, in which:—

Figure 1 is a side elevation of the complete machine.

Figure 2 is a diagram illustrating the relative arrangement of the shook drops and the main and supplemental shook receiving compartments.

Figure 3 is a detail perspective view of the adjustable, central shook rest plates hereinafter specifically referred to.

Figure 4 is a similar view of one of the side baffle or guide plates mounted upon the front end of the machine and hereinafter specifically referred to.

Figure 5 is a detail side elevation of the rear end of the machine.

Figure 6 is a rear end view, parts being broken away and in section.

Figure 7 is a detail perspective view of one of the shook stock presser wings hereinafter referred to.

Figure 8 is a detail vertical longitudinal section of the rear end of the machine taken substantially on the line 8—8 on Figure 6.

Figure 9 is a detail plan view of the said rear end of the machine.

Figure 10 is a similar view of the front end of the machine.

Figure 11 is a detail vertical longitudinal section of the front end of the machine taken substantially on the line 11—11 on Figure 16.

Figure 12 is a detail perspective view of the screw bearing nut on the front end of one of the adjustable guard rails hereinafter referred to.

Figure 13 is a similar view of the bearing nut on the front end of one of the stationary guard rails hereinafter referred to.

Figure 14 is a detail perspective view of one of the screw bearings mounted upon the ends of the continuous trackways hereinafter referred to.

Figure 15 is a similar view of one of the end bearings for one of the front guard rail adjusting screws hereinafter referred to.

Figure 16 is a vertical cross section of the front end of the machine taken on the line 16—16 on Figure 11.

Figure 17 is a detail longitudinal section, parts being in elevation, of one of the adjustable shook drop gates hereinafter referred to.

Figure 18 is a plan view thereof.

Figure 19 is a detail cross section on the line 19—19 on Figure 17, the flexible nose member being removed.

Figure 20 is a detail perspective view of one of the flexible nose members of one of the drop gates.

Figure 21 is a detail section illustrating the action of the pressure bar mechanism hereinafter referred to.

Figure 22 is a detail cross section taken on the line 22—22 on Figure 21.

Figure 23 is a detail plan view of one of the gear nests hereinafter referred to.

Figure 24 is a detail cross section of one of the gear nests attached to its supporting angle iron.

Figure 25 is a detail plan view of one of the traveling shook shifting mechanisms hereinafter referred to.

Figure 26 is a detail side elevation thereof, parts being broken away and in section.

Figure 27 is a detail perspective view of one of the stop sleeves mounted upon the ends of the shook shifter rocker shaft.

Figure 28 is a plan view of the portions adjacent the center of the machine.

Figure 29 is a detail cross section thereof, taken across adjacent the medial cross angle and which also illustrates the manner in which the shooks drop through into the receiving compartments.

Figure 30 is a detail section of the mechanism located at the rear of the machine, for vertically and laterally adjusting the adjustable guard rails, parts thereof being in elevation.

Figure 31 is a horizontal section taken on the line 31—31 on Figure 30.

Figure 32 is a detail perspective view of that part of the guard rail adjusting mechanism which is slidably fastened to the cross angle iron which supports the guard rails.

Figure 33 is a detail perspective view of the screw bearing nut which cooperates with the part shown in Figure 32.

Figure 34 is a side elevation of the cross angle which forms the support for the upper rails at the rear of the machine.

Figure 35 is a somewhat diagrammatic face view and part section, which illustrates the manner of vertically adjusting the board passage regulating gate.

Figure 36 is a detail side elevation, parts being broken away and in section, of one of the conveyor chains and a conveyor slat mounted thereon.

Figure 37 is a horizontal section of the said chain.

Figure 38 is a detail perspective view of one end of one of the conveyor slats.

Figures 39 and 40 are perspective views of one of the metal shook "fall" guides and the hanger therefor, respectively.

In the drawings, in which like numerals of reference indicate like parts in all the figures, 1—1 designate a pair of rear casting frames, which, together with a similar pair of front casting frames 2—2, form the principal means of support for the completely assembled mechanism.

The rear castings 1—1 carry, in suitable bearings thereon and near the top thereof, a cross or sprocket shaft 3. The front castings 2—2 carry a similar shaft 4 in a similar manner and the said shafts 3—4 are each provided, near their ends and inside the respective castings with sprocket members 5—5 and 6—6 respectively. The rear ordinary sprockets 5—5 are of greater diameter than the front or driven sprockets 6—6, and for providing for the desired parallel and relatively close relation of the oppositely traveling portions of the conveyor chains 7—7, which take over the said sprockets 5—5 and 6—6, I provide a pair of idler pulleys 9—9 suitably mounted upon stub shafts fixed to the casting frames 1—1 and in proper alignment with and adjacent to the said sprockets 5—5 as shown, (see Figures 5 and 8). The conveyor chains 7—7 are provided at intervals with conveyor bars or slats 8 projecting across at right angles from chain to chain and which serve to convey the box stuff or shook through the machine in a manner soon to be described.

Fixedly secured to each inside top face of the frame castings 1—1 and 2—2, and projecting continuously along the machine therebetween, are upper and lower chain carrying angles 10—10 and the said angles are provided with trackways 11—11 over which the chains 7—7 are guided while in the course of travel in conveying the shooks through the machine.

To provide for the proper driving of the conveyor chains 7—7, the mechanism may include a motor 12, upon the driving shaft of which is mounted a small pulley 13 which, through the belt 27, imparts rotary motion to a large pulley 14 mounted upon a cross shaft 15 having suitable bearing in the frame castings 1—1, and which is provided, at the end opposite the pulley 14, with a small pinion 16. Rotary motion, imparted to the shaft 15 as just described, is in turn imparted, through the small pinion 16, to a large spur gear 17 mounted upon a cross shaft 18 having suitable bearing in the frame castings 1—1 and which is provided, at that end which carries the gear 17, with an elliptical gear 19 which meshes with a like sized elliptical gear 20 mounted upon the projecting end of the sprocket shaft 3 before mentioned. The rotary motion thus imparted to the sprockets 5—5 through the various elements 12, 13, 27, 14, 15, 16, 17, 18 and the elliptical gears 19 and 20 causes the conveyor chains 7—7 to travel with an increasing and diminishing speed throughout its course of travel, due to the action of the said elliptical gears 19 and 20. The purpose for so driving the chains 7—7 to provide the intermittently fast and slow motion will later be described (see Figures 5 and 6).

It will be readily understood that as the speed of the chains 7—7 increases the power of drive decreases, and that as the speed of the chains 7—7 is decreased the power of drive greatly increases, this being due to change of leverage resultant from the change of radii of the driving faces as the elliptical gears 19—20 revolve. Though such occasions are rare it is possible for a box shook to become jammed in some part of the mechanism while in the course of its travel, due to the feeding of a defective board or the misadjustment of some part of the mechanism, and it will be readily understood that if this happened to occur during one of the "slow" travel intervals of the conveyor chains 7—7, during which interval the greatest driving power is being exerted, it would result in great damage to or wreckage of the particular parts engaged.

To prevent all possibility of wreckage of the machine parts, as above described, I have provided a compensating mechanism. Upon the end of the shaft 18 opposite the end which carries the gears 17 and 19, is mounted, to rotate therewith, a cam member 21 which engages a cam roller 25 mounted on the upper end of a bell crank lever pivoted at 24 and comprising an upper arm 22 and a lower arm 23. The said bell crank is made so that its arms 22 and 23 may be adjusted relatively to the desired angle. The lower arm 23 has rotatably mounted thereon an idler pulley 26 in engaging alignment with the transmission belt 27. By reference to Figures 5, 6 and 8, it will be seen that when the elliptical gears 19 and 20 are meshing so as to impart the greatest power to the chains 7—7, i. e., during an interval of slow travel (see Figures 5 and 8) the cam member 21 will be engaging the roller 25 so as to allow the belt 27 to slack and slip in event of an emergency such as above outlined, but that when the elliptical gears are meshing so as to impart a fast travel interval to the chains 7—7, see Figure 6, the cam 21 will engage the roller 25 in a manner for effecting a rocking of the bell crank lever to the position indicated in dot and dash lines on Figure 5 to cause the pulley 26 to effect tightening action upon the belt 27 as shown. Thus, it will be seen that should a shook become jammed as above described, the motive power would simply be stopped without wreckage of parts or harmful effect, the slipping of the belt absorbing all harmful shock during the high power intervals.

Fastened upon the tops of and extending across and beyond the rear frame castings 1—1 are a pair of angles 28—28 upon which is built a platform 29 for receiving the stacks of box shooks to be fed into the machine to support the same prior to such feeding.

The several frame castings 1—1 and 2—2 may be joined by suitable cross braces 30, as shown in Figure 6.

Rigidly secured to the bottom faces of the upper and lower track angles 10—10, and on a plane with the fore faces of the rear frame castings 1—1, are upper and lower cross angles 31—31, the purposes of which will presently appear.

Another cross angle 32 is rigidly secured to the bottom faces of the upper pair of track angles 10—10 and between these angles 32 and 31, upon suitable supporting members 34, is constructed a box shook stack receiving floor 33 upon either side of which is piled a stack of shooks for being fed one by one through the machine to be properly assorted and assembled in the desired manner.

Rigidly secured upon the top faces of and extending across and slightly beyond the upper fore corners of the rear frame castings 1—1 is another cross angle 35 and, rigidly secured centrally of the bottom face thereof is a rearwardly extended supporting bracket 36 upon which is adjustably secured a central shook stack resting table composed of a pair of steel plates 37—37. The plates 37—37 are each provided with longitudinal slots 38—38 through which pass the retaining and tightening bolts 39—39 and which provide for lateral adjustment of the width of the said central rest table to meet the requirements of the feeding of different length shooks. Each of the said plates 37—37 have down turned end portions 40—40 which form guide flanges for the stack of shooks as it is removed from the rest table and placed in proper position upon the particular end of the floor 33 of the hopper about to be described, see Figures 3, 8 and 9.

Rigidly secured to the rear face of the angle 35 and projecting vertically therefrom is a pair of angle irons 41—41. A pair of horizontally disposed angle irons 42—42 are secured to the bottom face of the angles 35 and the foremost one of the angles 28 and a pair of vertically disposed side or hopper forming plate 43 are rigidly secured to the inside faces of the angles 41—41 and 42—42 just described. The vertical angles 41—41 are joined at their top ends by another cross angle 44, as shown. Rigidly secured to and centrally of the upper cross angle 44 and the lower cross angle 35 is a center plate 45 which forms a part of the forward confines of the two sided hopper and which, together with the strap iron guide members 46 rigidly secured to the angle 44 and center plate 45, form guides for the pair of adjustable box shook passage controlling gates 47 which are each vertically adjustable to permit the passage of but a single box shook at a time. Slidably mounted upon the lower cross angle 35 and with the plate 45 and guide bars 46 acting as guides therefor, is a pair of gate controlling slide bars 51 each of which has a handle portion at its outer end, as shown, and have pivoted thereto, as at 50, a pair of parallel links 48 which are, in turn, pivoted at 49 to the respective control gate 47 and the said bars 51—51 are also provided adjacent their handle ends with a series of apertures so that the said bars, when moved longitudinally to make the desired increased or diminished box shook passage, may be pin locked to the vertical angles 41—41, as at 52—52, and thereby held to the desired adjustment (see Figures 6, 8 and 35).

Pairs of upper and lower bracket members 53—53 are rigidly secured to the upper cross angle 44 and to the cross angles 28—28 respectively and the said brackets provide upper and lower pivots for a pair of pressure wings 54—54 for each hopper side and which, by reason of their spring connections 55—55, exert forward pressure upon the stack of shooks placed within the hoppers and force the said stacks against the control gates hereinbefore described, see Figures 7, 8, and 9.

From the drawings, it will be seen that the machine is built double—that is to say—it includes two sets of hoppers, trackways and box shook receiving compartments and such being the case it should be clearly understood that the single machine may be set to assort and assemble box shooks of two different form sizes and as the parts of one side of the machine are exact duplicates of those at the opposite side of the machine, the parts of but one side will be described in detail when such is possible.

As the individually handled box shook is carried forwardly along the machine by the respective conveyor slat 8, it is caused to travel over an interrupted and a continuous trackway, the relation thereof with the said interrupted trackway being always the same because of the relation of the side plate 43 with said interrupted trackway, while the said continuous trackway is laterally adjustable to suit the length of the box shooks being worked upon at the particular time.

The machine is provided, at the rear face of the front frame castings 2—2, with upper and lower cross angles 85—85 corresponding in function to the cross angles 31—31 of the rear castings 1—1 and are likewise rigidly secured to the bottom faces of the upper and lower trackways 10—10, and, at regular intervals, one for each main box shook receiving compartment, other cross angles 58 are rigidly secured to the bottom faces of the upper and lower trackways 10—10, the purpose of all of which will presently appear.

Extending continuously and uninterruptedly over that length of the machine from the cross angles 31—31 at the front of the rear frames 1—1 to those 85 at the rear of the front frames 2—2, are upper and lower continuous trackways 56—56 and the said trackways are laterally adjustable over the angles 31—31, 58—58 and 85—85 in a manner soon to be described. The upper trackways are arranged with their upper or box shook engaging surfaces on a plane with the top of the hopper floor 33 so that the box shooks when passing off that floor will move smoothly thereonto.

As before stated, the box shooks, in their course of travel through the machine, are conveyed over upper and lower interrupted and continuous trackways, arranged and adjusted so that the ends of said shooks project slightly beyond each said trackway (see Figures 16 and 29), the said upper and lower trackways being relatively arranged and formed as indicated in Figures 2 and 29 to provide for the shook assortment and assembling in the manner later to be described in detail.

Each interrupted trackway is composed of a plurality, two for each main hopper, of fixed track portions 57 which are bolted securely to the intermediate cross angles 58, as shown, with the rigidly fixed end thereof projecting slightly beyond the said angle 58 to form one limit of a box shook drop opening 70, and the said projected end is rounded off on a large radius so that any slight off alignment which might exist when the box shook reaches its proper pocket and tends to drop will not cause the said shook to hang and stop the motion of the conveying mechanisms.

From the drawings it will be seen that the drop openings 70 are adjustable to suit the dimensions of the desired assortment being made and each includes the fixed drop limit above described and a movable drop limit soon to be described. In the practical development of the invention, the fixed drop limits, (see Figure 28) are arranged equidistant, in direction forwardly along the upper track and rearwardly along the lower track, while the movable drop limits, each having the same range of adjustment, are adjustably movable simultaneously in a manner soon to be described.

The other end of each said fixed track member 57 projects longitudinally over the respective shook receiving compartment in a direction opposed to the direction of travel of the box shooks and, as the plan of arrangement is to have an upper outgoing or forward travel track and a lower return or rear travel track, it will be seen that the direction of projection of those parts 57 of the upper track are arranged directly opposite to those of the lower track. The parts 57 are bent downwardly as at 59 and have secured thereto supplemental abutment pieces 61 for forming proper abutment guides for the movable portions 62 of the interrupted trackway, the said portions 62 being longitudinally and slidably connected to the fixed portions 57 by pin and slot connections 60—63, as shown in Figures 17 and 18.

The far end of the member 62 is downwardly turned as at 64 and is bifurcated to make provision for the insertion and pivot, at 66, of a yieldable nose member 65 which includes abutment lugs 67, is spring connected as at 68 to the pin 63 for holding the said nose in proper horizontal relation with the track, and has a slightly rounded nose 69 which forms the movable or adjustable limit of the box shook drop 70 above referred to. The said nose is rounded as at 69 to avoid the presentation of a perfect right angle point to a board which may be dropping on slight off alignment for reasons before stated.

As before stated, the movable parts 62 of the interrupted trackways are simultaneously adjustable, that is,—the width of all of the drops 70 may all be adjusted at one and the same time and it is to be understood that the range of adjustment of all the said movable parts 62 is the same by reason of the slots 60 thereof being all of the same length. The plan of the machine, however, is to have the drop openings 70 always, regardless of adjustment, each exactly one quarter of an inch larger in width, increasing successively from the first one adjacent the upper cross angle 31 along the upper tracks and back along the lower tracks to the last one nearest the lower cross angle 31. See diagram Figure 2. From this it will be seen that, because of the range of adjustment of the parts 62 being all the same, it is desirable that the gradually increasing relation of the original set be taken care of by making the fixed portions 57 of gradually decreasing length so that the range of adjustment of the machine as a whole will remain the same throughout. For example: Consider that in the original set up of the machine we slide the parts 62 out to the outward limit of their adjustment (just opposite that position shown in Figure 17) and that with the parts all in this position, we mount them upon the cross angles 58, (the parts 57 having been manufactured in lengths each one-quarter of an inch shorter than the preceding one), the drop openings will be each one-quarter of an inch wider than the preceding one and the first of such openings will be of a width equivalent to the smallest box shook which would probably be fed through the machine at any time. From this manner of construction and application, it will be readily apparent that a uniform range of adjustment is possible in all the parts, equivalent to the length of the slots 60, and that when the parts 62 of each upper and lower track are moved simultaneously the desired graduation of all the drop openings 70 is simultaneously attained.

By reference to Figure 17, it will be seen that a board clearly too large to drop through a particular opening 70 will readily pass over the nose 65, but when a board barely larger than that opening 70 reaches the nose 65, it may have a tendency to drop and would partially do so. This being the case, the box shook would engage the nose 65 and the cam curve 64 in the manner shown in dotted lines in the said Figure 17 and ride back up onto the trackway to be carried on and dropped into its proper compartment.

For simultaneously adjusting the drop members 62, I provide angle irons 71—71, one immediately beneath each track angle 10, and each said angle 71 is slidably supported on the front frame castings as at 72, on the medial supporting angle 74, as at 73, and has secured at its rear end a solid bearing block having a threaded aperture for receiving a screw bearing nut 75 which projects through a slotway 76 provided therefor in the frame castings 1—1. Each of the movable drop members 62 of the upper and lower trackways has securely bolted to the end thereof, as shown in Figures 17 and 18, one end of a bracket member 77 (to the upper trackway) or 78 (to the lower trackway), as the case may be, and the other ends of these brackets are all securely fastened, in any approved manner, to the slidable angle irons 71, so that when the said angles 71 are moved longitudinally, all of the members 62 are caused to move simultaneously and to the same degree.

Means is provided for manually effecting the desired sliding of the angles 71 and the said means is in the nature of a set of operating screws 79, one thereof being provided for each angle 71. Each said screw passes through the threaded aperture provided therefor in the screw bearing nuts 75, has an abutment collar which engages one side of the bearing web of the frame casting 1 as shown (see Figure 5), and has fixedly mounted upon the end thereof projecting through said frame web, a small pinion gear 81. The said projecting end is provided with a squared portion 80 to facilitate the application of a wrench for the purpose of adjusting the single angle 71.

While it is possible to thus adjust any single row of track elements simultaneously by moving a single angle 71 it is more desirable, during the usual use of the machine, that both the upper and lower trackways be adjusted simultaneously and so I provide an intermediate gear 82 which meshes with both the upper and lower gears 81, and is mounted upon a stub shaft 83 secured to the web of the frame 1 and which includes a hand wheel portion 84 for being hand engaged and turned to effect rotation of both the upper and lower screws 79 at once, thereby causing the simultaneous longitudinal movement of both the upper and lower angles in like degree. The stub shaft 83 is sufficiently long to permit the sliding out of mesh of the intermediate gear 82 in order to permit the adjustment of a single upper or lower track, if desired, as above described.

As previously explained, the box shooks, in their course of travel through the machine, are conveyed over and are supported by the interrupted trackway 57, 62 and 65, and the continuous trackway 56, and, as has been explained, the interrupted trackway bears a fixed relation with the box shook travel, so that, when the length of box shooks being fed into the machine is changed, provision must be made to compensate therefor. This is accomplished by laterally adjusting the continuous trackway 56 in a manner now to be explained. At the ends of each trackway 56 is fixedly secured a screw bearing nut 86 having a cutout portion 87 to accommodate the angles 31 or 85, as the case may be. A pair of long turning shafts 88—88 are disposed in adjacent parallel relation along the center of the machine, passing through bearing holes provided therefor in the various cross angles 31, 58 and 85, and, at the foremost projecting ends of each of said shafts, a squared end 89 is provided for the application of a wrench or other implement for turning. At the juncture of the cross angles 31 and 85 (and also at the center cross angle 58 if the length of the machine makes same desirable) the shafts 88—88 pass through gear nests 92 each having a flange 94 to be secured to the particular angle iron 31 or 85, and a cut out portion 93 for accommodating the said angles as shown. Within the gear nests the shafts 88 are provided with fixedly mounted driving gears 90 which mesh with like gears 91 secured upon adjusting screws 95 which project laterally through bearings therefor in the gear nest sides and which have their threaded ends in screw relation with the screw bearing nuts 86, so that when the particular shaft 88 is rotated it will cause rotation of the screws 95 and effect uniform lateral adjustment of the particular trackway 56 throughout its length. The construction and operation of the adjusting mechanism of both the upper and lower tracks 56 is the same. The bearing holes in the cross angles 58 for the shafts 88—88 may be reinforced by the application of small angle pieces, see Figures 28 and 29.

As has been before stated, the plan of the machine is to have an upper or forward travel track and a lower or rearward travel track with the drop openings 70 therein each increasing one quarter of an inch in width from the rear to the front over the upper trackways and from the front to the rear over the lower trackways. See diagram Figure 2. From this figure the plan of the machine will be readily apparent and it will be seen that the machine includes twelve main box shook receiving compartments at each side and under the trackways and also, that each said main compartment is divided into two supplemental compartments so that in reality there are twenty-four compartments on each side of the machine, one under each drop opening 70. It will also be seen that, by reason of the graduated adjustment and relative positions of the openings 70, as hereinbefore described, the "sum" of the widths of any two shooks which are caused to fall into the two supplemental compartments forming a main compartment are the same throughout the machine. This is due to the systematic arrangement of the openings 70 as described, so that if one considers the plan of the machine in either direction, he will note that the increase at each compartment on one track is attended by an equal decrease on the other track at the same compartment which causes a perfect balance of uniform "aggregate widths" such as the machine was set for. All the operator need do is to reach down into any main compartment, one hand in each of the supplemental compartments thereof and bring forth the two shooks which, placed together edge to edge, aggregate the size of box form desired.

In order that the box shooks may be conveyed across the lower trackways, they must drop off of the upper trackways and down onto the plane of the lower trackways to be conveyed thereover by the return travel of the chains 7—7, as they pass down over the front sprockets 6—6. For this purpose, I provide the front end of the machine with a floor 96 suitably supported as at 97 on a plane with the top faces of the lower trackways and, to guide the drop of the box shooks onto such floor, I provide side guides in the nature of thin metal plates 98 secured to the frame castings 2—2 by the brackets which form a part thereof, see Figures 4 and 16, and which have upper bent over portions as shown. Intermediate guide plates 99 are secured to reduced ends of the tracks 56 which project over the floor so as to be moved with said trackways and thereby always be in proper spaced relation with the said guides 98 properly guiding the dropping boards.

In order to prevent the dropping boards from passing back too far and to keep the same within the proper confines for being engaged by the particular conveyor slat 8 and carried over the lower trackways, I provide a baffle gate 100 swingably pivoted to the side guide plates 98—98 as at 101—101 to permit the passage of the cross slats 8 and at the same time allow the gate to hang low enough to prevent the shook from sliding thereunder, see Figure 11.

As the shooks near the ends of the upper trackways and are about to drop they come under the influence of a presser or down-kick bar 102 which has its ends 103 slidably mounted in guideways 105 in castings 106 secured one at each upper rear corner of the front frame castings 2—2, and the said bar is vertically adjustable through the medium of a screw 107 which threads through each bar end 103, the upper end thereof passing freely through a bore 108 in the top of the casting 106 and whose lower end, due to the interposition of a spring 109, normally rests against the top of the respective frame casting 2. The bar 102 has fixed to the bottom face thereof a box shook engaging face plate 104 curved up at the rear end to facilitate passage of the board thereunder and the front end of the said plate projects slightly beyond the bar 102 and beyond the ends of the upper trackways 56. When a shook is conveyed under the bar 102 the adjustment is such that the bar is caused to raise very slightly, thereby storing up energy in the spring 109. As the rear edge of the shook leaves the trackways the spring kicks the presser bar downward and the fore edge of the plate 104 gives the lagging board edge a downward kick, just sufficient to cause the whole board to drop absolutely flat onto the floor 96 below. See Figures 11, 21 and 22.

By reference to the drawings, it will be seen that the upper continuous and interrupted trackways are nearer the center of the machine than the lower trackways, as is clearly apparent from Figure 29. This is necessary to permit the box shooks passing over the upper trackways to fall down past the lower trackways when they come to their proper drop openings 70 without interference with such lower interrupted trackways.

It will be understood that the box shooks which are passing over (being too large to drop through) the upper track drop openings must be assorted by the lower trackways. While travelling over the upper trackways the shooks are not in suitable position to ride over the lower trackways and I have provided suitable mechanism for shifting the said shooks to proper relation with the lower trackways and such mechanism will now be described. Cooperative with the set of trackways at each side of the machine, I provide a shook shifter flange arm 110 suitably supported with its end 111 upturned and adapted to rest upon the foremost cross angle 58 inwardly and just clear of the path of travel of the box shook ends nearest the machine center and having an outwardly bent cam face portion 112 projected into the path of the inner advance corner of the travelling box shook for the purpose of engaging the same to shift the shook laterally into proper relation with the lower trackways, see Figures 25 and 26.

In order that the said cam arm 110—112 may effect the proper shifting of varied length box shooks, according to the set of the machine, and that the end 111 be not thrown too high by the cross conveyor slat 8 as the same passes thereunder and thus prevent proper engagement of the shifting devices throughout the whole of the shifting action, I provide the said cam arm with a yieldable and counterbalanced pivot connection which is laterally adjustable to suit the requirements of the set of the machine and the lengths of the box shooks being conveyed therethrough.

Having suitable bearings at its ends in the castings 106—106 is a rocker shaft 118 having a spline connection 117 for slidably receiving thereon a counterweight member 116. Each member 116 is split and provided with a clamp screw 119 for clamping the same at its properly adjusted position on the shaft 118. Pivoted at the rear end of each member 116, as at 117, is a pendant U bracket 114 which is rigidly connected, as at 113, to the cam or shifter arm 110—112 to properly support the same in engaging relation with the inner ends of the conveyed box shooks. By reference to Figure 25, it will be seen how the shifter arm 110—112 operates to effect the lateral shifting of the conveyed box shooks from their traveling relation upon the upper trackways to proper traveling relation with the lower trackways, the shifting action taking place prior to the dropping of the boards to the plane of the lower trackways, as before described.

By reference to Figure 26, the manner in which the connection above referred to, adjusts itself so as to prevent great elevation of the end 111 as the slats 8 pass thereunder and under the arm 110—112, and in a manner providing for proper engagement with the box shooks throughout the shifting action, will be readily apparent. The force necessary to lift the said arm 110—112 is greatly reduced by the counterweight 116.

The rocker shaft 118 has fixed at each end thereof, a stop collar 120 which engages a stop boss 121 integral with the inner face of each casting 106 and the said stop collars and bosses coengage to effect a stop in the rotation of the shaft 118 in such manner as to always leave the parts in the normal position shown in full lines in Figure 26, after the parts have been rocked to permit the passage of a cross slat 8.

In order to prevent any possibility of the box shooks jumping up or becoming dislodged from engagement with the conveyor slats during the course of travel over the upper trackways of the machine, I provide a lateral adjustable guard rail and a fixed guard rail for each side of the machine. The fixedly mounted guard rails serve only to prevent upward movement of the box shooks and are vertically adjustable to accommodate varying thickness of the shooks being worked upon, but the laterally adjustable ones serve to guide and ensure flat falling of the box shooks into their proper compartments in addition to that function and for this reason are made laterally adjustable relative to the position adjustment of the continuous trackway cooperative therewith and vertically adjustable also for the reason stated.

The adjustable guard rails are designated 122 and the fixed or stationary rails 123. A screw bearing nut 124 having a suitable cross bore is secured to the front end of each rail 123 and similarly shaped nuts 125 having internally threaded cross bores are secured one to the front end of each rail 122.

Adjusting screws 126 are provided at the front end of the machine for effecting lateral movement of the adjustable guard rails 122 at that end and the threaded shank portion of each set screw passes through the threaded aperture 127 of the respective nut 125 and the plane shanks of the screws pass freely through the bores 128 in the nuts 124 of the rails 123.

Bearing brackets 129 are provided, one for each screw 126, and the said brackets are secured at the opposite ends of a cross angle 130 vertically adjustably secured to the brackets 106 through the slot and set screw connections 131—132. Thrust collars 133 are secured to the screws 126 and serve to prevent longitudinal movement of the same so that when a wrench is applied to the squared ends 134 of the screws 126 and the same rotated the rails 122 will be laterally moved according to the direction of rotation.

Each nut 123—125 is also provided with a vertically threaded tap 135 adapted to receive a set screw 136, the ones thereof cooperating with the nuts 124 of the stationary guard rails passing through apertures in the cross angle 130 and those thereof cooperative with the nuts 125 of the adjustable guard rails 122 passing through elongated slotways 137 provided in that cross angle. Thus, by loosening the set screws 136 last mentioned and operating the screws 126 the adjustable rails 122 may be moved and by again tightening those screws the same may be rigidly held to their adjusted position. The set screws 136 serve to secure the guard rails to the cross angle 130 and it will be readily understood that by reason of the connections 131—132, before referred to, such vertical adjustment of the guard rails as may be necessary to accommodate varied shook thickness may be made. The actual vertical movement of the cross angle 130 may be effected by the set screws 138 which pass vertically through the extended foot portions 139 of the brackets 106, see Figure 21.

To provide for the mounting of the stationary and adjustable guard rails 123—122 at the rear of the machine, I provide a cross angle 140 which is mounted upon the cross angle 135 in opposition thereto to provide a sort of trough therebetween, see Figures 9 and 30. The cross angle 140 is provided with a pair of longitudinal slots 141, one thereof being provided to cooperate with each adjustable guard rail 122, see Figures 6, 30, 31 and 34.

A longitudinal lug projection 142 of a casting 143 is slidable in each of the slotways 141, the ends 144 of each said castings being slidably secured to the cross angle 140 by a bolt 145 and a second bolt 146 having an enlarged nut head 147 provided with an internally threaded cross aperture. The rearmost end of each rearwardly adjustable guard rail 122 is connected to the casting 143 in the manner soon to be described and for effecting lateral adjustment of the guard rails at its end I provide a pair of adjusting screws 148, the threaded shanks of each of which pass through the respective ones of the enlarged nut heads 147 secured to the said casting.

Each adjusting screw 148 includes an extended squared head 149 and passes through a bearing member 150, one thereof being secured adjacent each end of the cross angle 140, thrust collars 151 being secured to the shanks of the screws 148 to abut the said bearing member and prevent longitudinal movement of the said screw.

The casting 143 is provided with a forwardly projected face tension 152 and a threaded aperture 153.

For suitably connecting the adjustable guard rails 122 with the laterally adjustable casting 143, and in a vertically adjustable manner, I provide a pair of castings 154, one thereof being secured to the rearmost end of each said guard rail. Each casting 154 includes a vertical standard 155 flanged at 156 to slidably engage the face tenon 152 of the opposing casting 143 and being provided with a vertically elongated slot 157 permitting vertical movement of the set screw which passes therethrough and into the threaded socket 153 provided in the casting 143, the set screw and vertical slot connection providing for vertical adjustment of relation between the castings 154 and 143 for a purpose hereinbefore explained.

Each casting portion 155 includes a rearwardly projecting and thread tapped cap lug 158 for accommodating the adjustment screw 159 which cooperates with the adjustment features just above referred to for effecting such vertical adjustment of the guard rails as may be necessary.

Inasmuch as the guard rails 125 are stationary or are vertically adjustable only, the same means may be employed for mounting the rear ends thereof as have just been described relative to the adjustable guard rail. The longitudinal lug projections 142, however, may be omitted and the casing 143 securely bolted to the cross angle 140. The vertical adjusting features 152—153—157 and 159 function the same in this case as for the laterally mounted guard rails.

When the machine is constructed of considerable length it will be found desirable to support the guard rails centrally of the ends of the machine in a manner such as is illustrated in Figures 1, 28 and 29 of the drawings. In the figures referred to I have illustrated a cross angle 161 having the ends thereof slot and set screw connected to the central supports 74, as at 162, suitable adjustment screws 163 being provided for effecting vertical adjustment of the guard rails at this point. The cross angle 161 is provided with longitudinal slots 164 through which pass the securing set screws 165 cooperating with thread-tapped blocks secured to the guard rails 122 and 125.

Upper and lower flat bars 166 are secured to the top faces of the cross angles 58 medially of the sides of the machine and a lower centrally positioned up jump guard rail 177 is secured to and suspended from the top one of the bars 166 by the brackets 178 to be in position for engaging the rearwardly traveling conveyor slats 8 in the manner indicated in Figure 29 of the drawings. The bars 166 serve to strengthen the machine against vibrations through the central portion.

To ensure proper alignment of the box shooks which have dropped off the ends of the upper trackways onto the floor 96 with the particular conveyor slat 8 which is to carry the same rearwardly along the lower trackways I provide an aligning gate 179 pivoted at its ends as at 180 to the castings 22. The gate 179 is freely swingable but offers sufficient resistance to the box shooks passing thereunder to force them back into tight engagement and perfect alignment with the conveyor slat 8 conveying the same, see Figure 11.

By reference to Figures 1, 2, 16 and 29 it will be observed that as the shooks pass along under the urge of the conveyor slats 8 and along the continuous and interrupted trackways, as the shooks reach the drop opening through which they are adapted to fall, they readily fall therethrough in the manner indicated in Figure 29, the laterally adjustable guard rail serving to guide their fall and preventing tilting while falling. As before stated, in the illustration of the invention here made twelve main receiving compartments 181 are provided at each side of the machine and supported by the lower framing 182. The main compartments 181 are sub-divided each into two supplemental compartments representing a form dimension by the partition wall 183. While this partition wall may be employed, if desired, it is not necessary because the boards fall so evenly there is no danger of their intermingling and thwarting the assembling action. An inclined fall guide 184, see Figures 29 and 39 cooperates with each compartment and the said fall guides include inner flanges 185 secured to the bottom face of the lower laterally adjustable continuous trackways and are joined together by the supporting brackets 186 which straddle the lower set of cross angles 58, see lower Figure 40.

As many vertical side supporting angles 187 as may be necessary considerate of the length of the machine may be provided intermediately of the front and rear castings 1 and 2 and the medial vertical side angles 74.

The front cross shaft 4 may be adjustably mounted as at 188, to make possible any adjustment of the conveyor chains 7 necessary.

It should be understood that all of the advance edges of the drop openings 70 are equi-distant and that the intermittently fast and slow motion imparted to the conveyor chains 7 through the medium of the elliptical gears is so regulated that the slowest travel of the said chains occurs just as the foremost edges of the conveyor slats approach the advance edges of the drop openings so that the falling of the shooks takes place during the slowest travel integral of the chain thereby greatly facilitating perfect assortment of the shooks to the desired standard widths.

Operation.

Let us assume that the machine is set according to the diagrammatic illustration in Figure 2 of the drawings to accomplish assortment and assembly of standard widths of parts to provide 13¾ inch forms provided for by the assembling into adjacent subcompartments such pairs of standard width shooks as will aggregate the 13¾ inch dimensions, as for example, 4 inch and 9¾ inch shooks; 4¾ inch and 9 inch shooks, 5½ inch and 8¼ inch shooks, and the like.

Irrespective of widths, the operator of the machine grasps a stack of shooks and places them in one of the hoppers to the right or to the left of the machine, (if the machine is set to assemble the same dimensioned forms at each side), with the outermost corners of the shooks abutting the respective side plate 43 and the foremost edges thereof abutting the control gate 45. The slide bars 51 are adjusted to provide the proper bottom opening for effecting single discharge of the boards under conveyor slat action, see Figures 9 and 35. The spring pressed wings 54 will serve to hold the stack in the position before stated.

As a conveyor slat 8 advances it will engage the lowermost board of the stack and carry it out of the hopper onto the upper continuous and interrupted trackways, the remainder of the stack falling down onto the table so that the lowermost one thereof will be in position to be picked up by the slat falling.

Let us assume that the shook thus conveyed out of the conveyor is of a standard width of five inches. It will freely pass over the first four drop openings 70 which, according to the diagram referred to, are of four inch, 4¼ inches, 4½ inches and 4¾ inches respectively in width. Should, by carelessness, the supposedly five inch shook have been cut slightly under size, say to 4⅞ inches and the same have a tendency to drop through the 4¾ inch opening it would engage the flexible nose 65 thereof and ride back up onto the track in the manner illustrated in Figure 17 of the drawings to be deposited into its proper compartment.

Let us assume that the next shook conveyed out of the hopper is of 8¾ inches standard width or in other words, a shook which should be deposited into the sub-compartment next to that in which the five inch shook was deposited so that the two shooks combined will aggregate the 13¾ inch form width, such shook would pass freely over all of the drop openings in the upper trackways and would engage the shifter mechanism in the manner illustrated in Figure 25 of the drawings to thereby be shifted from the position illustrated at the top of Figure 29 or in traveling relation with the upper trackways to a position which would bear the same relation to the lower trackways (see the lower portion of Figure 29). The shook will next be conveyed under the down kick bar 102, in the manner indicated in dotted lines in Figure 21, thereby storing up energy in the spring 109 so that as the rearmost edge of the shook passes over the foremost edge of the trackways the heel of the plate 104 will engage the lagging edge thereof and cause the shook to fall flatly, as indicated in full lines on that figure, down onto the receiving floor 96 on a plane with the lower trackways. During this falling action the pivoted gate 100 will overcome any tendency of the shook to pass back beyond the influence of the conveyor slats 8. The shook thus dropped rests upon the floor 96 until it is picked up by a conveyor slat 8 and carried rearwardly toward the lower trackways. The shook will next be brought into engagement with the swingable aligning gate 179 and proper abutment of and alignment with the conveyor slat thereby assured after which the shook will pass under the gate and rearwardly over the lower trackways passing over the drop openings intervening until it reaches the drop opening adapted to receive 8¾ inch widths through which it will readily fall into the receiving sub-compartment.

With the shooks thus assorted and assembled, an attendant of a machine has but to approach any one of the twelve compartments at a side of the machine, and to reach one of his hands into each of the sub-compartments and pull forth two shooks, knowing that the two shooks laid together will aggregate the form width desired. Thus all effort and measurement on the part of an attendant is made unnecessary, making it possible to assort and assemble a great many more times the number of shooks as would be possible by hand methods, and also making possible the employment of cheap unskilled labor.

From the foregoing description, taken in connection with the accompanying drawings, it is thought the complete construction, manner of operation and the advantages of my invention will be readily understood by those skilled in the art to which it relates.

What I claim is:

1. In a machine of the class described, trackways provided with drop openings of varied sizes over which the shooks are adapted to be conveyed and through which proper ones thereof are adapted to fall to be assorted according to size, compartments for receiving the assorted shooks, and yieldable noses forming the advance limits of the said drop openings.

2. In a machine of the class described, trackways provided with drop openings of sucessively increasing widths over which the shooks are adapted to be conveyed and through which proper ones thereof are adapted to fall to be assorted according to size, the said drop openings each being formed by a fixed and a movable limit, each shaped on a transverse arc overcoming tendency of falling shooks to bind, and compartments beneath the drop openings for receiving the falling shooks.

3. In a machine of the class described, trackways provided with drop openings of successively increasing widths over which the shooks are adapted to be conveyed and through which proper ones thereof are adapted to fall to be assorted according to size, the said drop openings each being formed by a fixed and a movable limit, each movable limit including a yieldable nose and a down turned cam member for supporting the same, and compartments beneath the drop openings for receiving the falling shooks.

4. In a machine of the class described, trackways provided with drop openings of successively increasing widths over which the shooks are adapted to be conveyed and through which proper ones thereof are adapted to fall to be assorted according to size, the said drop openings each being formed by a fixed and a movable limit, each movable limit including a yieldable nose and a down turned cam member for supporting the same, means for adjusting each movable limit to control the dimensions of the individual drop openings, and compartments beneath the drop openings for receiving the falling shooks.

5. In a machine of the class described, trackways provided with drop openings of successively increasing widths over which the shooks are adapted to be conveyed and through which proper ones thereof are adapted to fall to be assorted according to size, the said drop openings each being formed by a fixed and a movable limit, each movable limit including a yieldable nose and a down turned cam member for supporting the same, means for adjusting each movable limit to control the dimensions of the individual drop openings, means for moving all of the movable limits to adjust all of the drop openings simultaneously, and compartments beneath the drop openings for receiving the falling shooks.

6. In a machine of the class described, trackways provided with drop openings over which the shooks are adapted to be conveyed and through which proper ones thereof are adapted to fall to be assorted according to size, the rearmost edges of the drop openings all being positioned equidistant, compartments beneath the drop openings for receiving the shooks, a slatted conveyor for conveying the shooks, and means for moving the conveyor with fast and slow travel intervals, substantially as and for the purposes described.

7. In a machine of the class described, trackways provided with drop openings over which the shooks are adapted to be conveyed and through which proper ones thereof are adapted to fall to be assorted according to size, the rearmost edges of the drop openings all being positioned equidistant, compartments beneath the drop openings for receiving the shooks, a slatted conveyor for conveying the shooks, and means for moving the conveyor with regularly occurring fast travel and pause intervals, each pause interval occurring during the shook falling interval.

8. In a machine of the class described, trackways provided with drop openings over which the shooks are adapted to be conveyed and through which proper ones thereof are adapted to fall to be assorted according to size, the rearmost edges of the drop openings all being positioned equidistant, compartments beneath the drop openings for receiving the shooks, a slatted conveyor for conveying the shooks, and means for moving the conveyor with regularly occurring fast travel and pause intervals, each pause interval occurring during the interval in which a conveyor slat is passing over a rearmost drop opening edge.

9. In a machine of the class described, trackways having equidistantly spaced drop openings over which the shooks are conveyed and through which proper ones thereof are adapted to fall, compartments for receiving the shooks after falling, a slatted conveyor for conveying the shooks, means including elliptic gears for moving the conveyor with regularly occurring fast travel and pause intervals, each pause interval occurring during the shook dropping interval, and means cooperative with the said conveyor moving means for effecting positive action thereof during the conveyor fast travel interval and for permitting lost motion if necessitated by any unusual strain occurring during a conveyor pause interval.

10. In a machine of the class described, trackways provided with drop openings over which the shooks are adapted to be conveyed and through which proper ones thereof are adapted to fall to be assorted according to size; a hopper into which a stack of shooks to be assorted are placed, the said hopper including a floor on a plane with the trackways, a side limit wall, a front limit wall and an adjustable gate for permitting passage of the lowermost shook of the stack only; and compartments beneath the drop openings for receiving the falling shooks.

11. In a machine of the class described, trackways provided with drop openings over which the shooks are adapted to be conveyed and through which proper ones thereof are adapted to fall to be assorted according to size; a hopper into which a stack of shooks to be assorted are placed, the said hopper including a floor on a plane with the trackways, a side limit wall, a front limit wall and an adjustable gate for permitting passage of the lowermost shook of the stack only; a presser wing for holding the stack of shooks against the front limit wall, and compartments beneath the drop openings for receiving the falling shooks.

12. In a machine of the class described, trackways provided with drop openings over which the shooks are adapted to be conveyed and through which proper ones thereof are adapted to fall to be assorted according to size; a hopper into which a stack of shooks to be assorted are placed, the said hopper including a floor on a plane with the trackways, a side limit wall, a front limit wall and an adjustable gate for permitting passage of the lowermost shook of the stack only; parallel link, slide bar and pin connections for vertically adjusting the gate; and compartments beneath the drop openings for receiving the falling shooks.

13. In a machine of the class described, trackways provided with drop openings over which the shooks are adapted to be conveyed and through which proper ones thereof are adapted to fall to be assorted according to size; a hopper into which a stack of shooks to be assorted are placed, the said hopper including a floor on a plane with the trackways, a side limit wall, a front limit wall and an adjustable gate for permitting passage of the lowermost shook of the stack only; an adjustable rest table for receiving a stack of shooks prior to being deposited into the hopper, and compartments beneath the drop openings for receiving the falling shooks.

14. In a machine of the class described, upper forward travel trackways and lower rearward travel trackways provided with drop openings of varied sizes over which the shooks are adapted to be conveyed and through which proper ones thereof are adapted to fall to be assorted and assembled according to size and the desired form width, and compartments for cooperating with pairs of upper and lower trackway drop openings in receiving pairs of assorted shooks dropped therethrough and assembling them to provide the desired form width.

15. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed and each being defined by a fixed and a movable limit, means for adjusting all of the movable limits simultaneously and in like degree to adjust the drop openings, and compartments beneath the drop openings for receiving the falling shooks.

16. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed and each being defined by a fixed and a movable limit, and compartments for cooperating with pairs of upper and lower trackway drop openings in receiving pairs of assorted shooks dropped therethrough and assembling them to provide the desired form width.

17. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed and each being defined by a fixed and a movable limit, each movable limit including a yieldable nose and a down turned cam member supporting the same in cooperative relation, means for adjusting all of the movable limits simultaneously and in like degree to adjust the drop openings, and compartments beneath the drop openings for receiving the falling shooks.

18. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed and each being defined by a fixed and a movable limit, each movable limit including a yieldable nose and a down turned cam member supporting the same in cooperative relation, all of the fixed limits of the drop openings being equidistant, a slatted conveyor for conveying the shooks, means for moving the conveyor with regularly occurring fast travel and pause intervals, each pause interval occurring during the interval in which a conveyor slat is passing over a drop opening, means for adjusting all of the movable limits simultaneously and in like degree to adjust the drop openings, and compartments beneath the drop openings for receiving the falling shooks.

19. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed, receiving compartments beneath the trackways adapted to cooperate with successive pairs of an upper and a lower drop opening, each such pair of drop openings being of widths aggregating the width of box form desired so that the shooks falling therethrough will be properly assembled in the compartments.

20. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed, receiving compartments beneath the trackways adapted to cooperate with successive pairs of an upper and a lower drop opening, each such pair of drop openings being of widths aggregating the width of box form desired so that the shooks falling therethrough will be properly assembled in the compartments, and means for adjusting the widths of all of the drop openings simultaneously to adapt the machine for assembling varied sizes of box forms.

21. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed, and each being defined by a rearmost fixed and a foremost movable limit, all of the fixed limits of the drop openings being equidistant, a slatted conveyor for conveying the shooks, means for moving the conveyor with regularly occurring fast travel and pause intervals, each pause interval occurring during the interval in which a conveyor slat is passing over a rearmost drop opening limit, receiving compartments beneath the trackways adapted to cooperate with successive pairs of an upper and a lower drop opening, each such pair of drop openings being of widths aggregating the width of box form desired so that the shooks falling therethrough will be properly assembled in the compartments, and means for adjusting the widths of all of the drop openings simultaneously while retaining the sameness of aggregate widths of all of the pairs of such openings.

22. In a machine of the class described, trackways provided with drop openings of successively increasing widths over which the shooks are adapted to be conveyed and through which proper ones thereof are adapted to fall to be assorted according to size, the said drop openings each being formed by a fixed and a movable limit, each movable limit including a slidably adjustable member having a down turned shook receiving cam end and a yieldable nose pivoted thereto, a slidable rail to which all of the slidably adjustable members are secured, means for longitudinally moving the rail to effect adjustment of all the drop openings simultaneously, and compartments beneath the drop openings for receiving the falling shooks.

23. In a machine of the class described, trackways provided with drop openings of successively increasing widths over which the shooks are adapted to be conveyed and through which proper ones thereof are adapted to fall to be assorted according to size, the said drop openings each being formed by a fixed and a movable limit, each movable limit including a slidably adjustable member having a down turned shook receiving cam end and a yieldable nose pivoted thereto, a fixedly mounted track member for slidably supporting each slidably adjustable member and each of which projects in the direction of travel of the conveyor to provide the fixed limit of the next succeeding drop opening, a slidable rail to which all of the slidably adjustable members are secured, means for longitudinally moving the rail to effect adjustment of all the drop openings simultaneously, and compartments beneath the drop openings for receiving the falling shooks.

24. In a machine of the class described, upper forward travel trackways and lower rearward travel trackways provided with drop openings over which the shooks are adapted to be conveyed and through which proper ones thereof are adapted to fall to be assorted as to size and assembled according to form width desired, all of the drop openings being of successively increasing widths according to the direction in which the shooks are conveyed and each being defined by a fixed and a movable limit, each movable limit including a slidably adjustable member having a down turned shook receiving cam end and a yieldable nose pivoted thereto, a fixedly mounted track member for slidably supporting each slidably adjustable member and each of which projects in the direction of travel of the conveyor to provide the fixed limit of the next succeeding drop opening, slidable rails to which all of the slidably adjustable members are secured, means for longitudinally moving the rails to effect adjustment of all the drop openings simultaneously, means for adjusting all of the movable limits simultaneously and in like degree to adjust the drop openings, and compartments beneath the drop openings for receiving the falling shooks.

25. In a machine of the class described, trackways provided with drop openings of varied sizes over which the shooks are adapted to be conveyed and through which proper ones thereof are adapted to fall to be assorted according to size, compartments for receiving the assorted shooks, yieldable noses forming the advance limits of the said drop openings, and adjustable guard rails for preventing upward movement of the box shooks while being conveyed and for cooperating with the trackways in providing for proper falling of the shooks.

26. In a machine of the class described, trackways provided with drop openings over which the shooks are adapted to be conveyed and through which proper ones thereof are adapted to fall to be assorted according to size, the rearmost edges of the drop openings all being positioned equidistant, compartments beneath the drop openings for receiving the shooks, a slatted conveyor for conveying the shooks, adjustable guard rails for preventing upward movement of the box shooks while being conveyed and for cooperating with the trackways in guiding the fall of the shooks, and means for moving the conveyor with regularly occurring fast travel and pause intervals, each pause interval occurring during the interval in which a conveyor slat is passing over a rearmost drop opening edge.

27. In a machine of the class described, upper forward travel trackways and lower rearward travel trackways provided with drop openings of varied sizes over which the shooks are adapted to be conveyed and through which proper ones thereof are adapted to fall to be assorted and assembled according to size and the desired form width, compartments for cooperating with pairs of upper and lower trackway drop openings in receiving pairs of assorted shooks dropped therethrough and assembling them to provide the desired form width, the said lower trackways being positioned outwardly laterally of the positions of the upper trackways, and shifter devices for shifting the box shooks which pass over the upper trackways to travel-alignment with the lower trackways.

28. In a machine of the class described, upper forward travel trackways and lower rearward travel trackways provided with drop openings of varied sizes over which the shooks are adapted to be conveyed and through which proper ones thereof are adapted to fall to be assorted and assembled according to size and the desired form width, a slatted conveyor for conveying the shooks over the trackways, compartments for cooperating with pairs of upper and lower trackway drop openings in receiving pairs of assorted shooks dropped therethrough and assembling them to provide the desired form width, the said lower trackways being positioned outwardly laterally of the positions of the upper trackways, and shifter devices for shifting the box shooks which pass over the upper trackways to travel-alignment with the lower trackways, the said shifter devices each including a rearwardly extended arm having an upturned end facilitating upward displacement by a conveyor slat and a cam portion for effecting the shifting action and being adjustably mounted to adapt the same to the shifting of varied lengths of shooks.

29. In a machine of the class described, upper forward travel trackways and lower rearward travel trackways provided with drop openings of varied sizes over which the shooks are adapted to be conveyed and through which proper ones thereof are adapted to fall to be assorted and assembled according to size and the desired form width, a slatted conveyor for conveying the shooks over the trackways, compartments for cooperating with pairs of upper and lower trackway drop openings in receiving pairs of assorted shooks dropped therethrough and assembling them to provide the desired form width, the said lower trackways being positioned outwardly laterally of the positions of the upper trackways, and shifter devices for shifting the box shooks which pass over the upper trackways to travel-alignment with the lower trackways, the said shifter devices each including a rearwardly extended arm having an upturned end facilitating upward displacement by a conveyor slat and a cam portion for effecting the shifting action, and being provided at its front end with a yieldable pivot as and for the purposes described.

30. In a machine of the class described, upper forward travel trackways and lower rearward travel trackways provided with drop openings of varied sizes over which the shooks are adapted to be conveyed and through which proper ones thereof are adapted to fall to be assorted and assembled according to size and the desired form width, a slatted conveyor for conveying the shooks over the trackways, compartments for cooperating with pairs of upper and lower trackway drop openings in receiving pairs of assorted shooks dropped therethrough and assembling them to provide the desired form width, the said lower trackways being positioned outwardly laterally of the positions of the upper trackways, shifter devices for shifting the box shooks which pass over the upper trackways to travel-alignment with the lower trackways, the said shifter devices each including a rearwardly extended arm having an upturned end facilitating upward displacement by a conveyor slat and a cam portion for effecting the shifting action, and being pivoted at its front end to a counterweight, and a rock shaft upon which the counterweight is adjustably secured.

31. In a machine of the class described, upper forward travel trackways and lower rearward travel trackways, provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the ends of the upper trackways are adapted to fall, and means for causing the shooks so conveyed to fall flatly onto the said floor.

32. In a machine of the class described, upper forward travel trackways and lower rearward travel trackways, provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the ends of the upper trackways are adapted to fall, means for causing the shooks so conveyed to fall flatly onto the said floor, said means comprising a presser bar which projects slightly beyond the upper trackways and under which the shooks are conveyed and being adapted to impart a down-kick to the lagging end of the shooks as they fall off the said trackways.

33. In a machine of the class described, upper forward travel trackways and lower rearward travel trackways provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the ends of the upper trackways are adapted to fall, means for causing the shooks so conveyed to fall flatly onto said floor, said means comprising a spring pressed bar under which the shooks are conveyed and which includes an up-turned receiving portion and a heel portion that projects beyond the upper trackways, springs tending to force the bar downwardly, and screws for limiting the spring action and for vertically adjusting the position of the bar.

34. In a machine of the class described, upper forward travel trackways and lower rearward travel trackways, provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the ends of the upper trackways are adapted to fall, means for causing the shooks so conveyed to fall flatly onto the said floor, and guide plates for guiding the fall of the shooks from the upper trackway ends onto the said floor.

35. In a machine of the class described, upper forward travel trackways and lower rearward travel trackways, provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the ends of the upper trackways are adapted to fall, a slatted conveyor for conveying the shooks forwardly over the upper trackways and rearwardly over the lower trackways, and a swingable gate permitting passage of the conveyor slats on their rearward travel but preventing passage of a falling shook beyond influence of the said slats.

36. In a machine of the class described, upper forward travel trackways and lower rearward travel trackways, provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the end of the upper trackways are adapted to fall, a slatted conveyor for conveying the shooks forwardly over the upper trackways and rearwardly over the lower trackways, and a swingably mounted aligning gate adapted to be engaged by the box shooks prior to passage rearwardly onto the lower trackways to assure perfect alignment thereof with the respective conveyor slats.

37. In a machine of the class described, upper forward travel trackways and lower rearward travel trackways, provided with drop openings of varied sizes over which the shooks are adapted to be conveyed and through which proper ones thereof are adapted to fall to be assorted and assembled according to size and the desired form width, a floor supported on a plane with the lower trackways and onto which the shooks conveyed over the ends of the upper trackways are adapted to fall, means for causing the shooks so conveyed to fall flatly onto the said floor, guide plates for guiding the fall of the shooks from the upper trackway ends onto the said floor, a slatted conveyor for conveying the shooks forwardly over the upper trackways and rearwardly over the lower trackways, a swingable gate permitting passage of the conveyor slats on their rearward travel but preventing passage of a falling shook beyond influence of the said slats, and a swingably mounted aligning gate adapted to be engaged by the box shooks prior to passage rearwardly onto the lower trackways to assure perfect alignment thereof with the respective conveyor slats.

38. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, and compartments for cooperating with pairs of upper and lower trackway drop openings in receiving pairs of assorted shooks dropped therethrough and asembling them to provide the desired form width.

39. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, compartments for cooperating with pairs of upper and lower trackway drop openings in receiving pairs of assorted shooks dropped therethrough and assembling them to provide the desired form width, each being defined by a fixed and a movable limit, each movable limit including a yieldable nose and a down turned cam member supporting the same in cooperative relation, all of the fixed limits of the drop openings being equidistant, a slatted conveyor for conveying the shooks over the trackways, means for moving the conveyor with regularly occurring fast travel and pause intervals, each pause interval occurring during the interval in which a conveyor slat is passing over a drop opening, means for adjusting all of the movable limits simultaneously and in like degree to adjust the drop openings, and compartments beneath the drop openings for receiving the falling shooks.

40. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, compartments for cooperating with pairs of upper and lower trackway drop openings in receiving pairs of assorted shooks dropped therethrough and assembling them to provide the desired form width, means for adjusting the positions of the continuous tracks laterally in like degree throughout their length and adjustable guard rails for preventing upward movement of shooks travelling over the upper trackway and for cooperating with the upper continuous track in guiding the fall of the shooks through the drop openings.

41. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, compartments for cooperating with pairs of upper and lower trackway drop openings in receiving pairs of assorted shooks dropped therethrough and assembling them to provide the desired form width, means for laterally adjusting the positions of the continuous tracks laterally in like degree throughout their length and vertically and laterally adjustable guard rails for preventing upward movement of shooks travelling over the upper trackway and for cooperating with the upper continuous track in guiding the fall of the shooks through the drop openings.

42. A machine of the class described, upper forward travel trackways and lower rearward travel trackways, said upper and lower trackways each including an inner continuous track, and an outer track interrupted by drop openings of widths successively increasing according to the direction of travel of the conveyed box shooks, compartments for cooperating with pairs of upper and lower trackway drop openings in receiving pairs of assorted shooks dropped therethrough and assembling them to provide the desired form width, and each being defined by a fixed and a movable limit, all of the fixed limits of the drop openings being equidistant, a slatted conveyor for conveying the shooks, means for moving the conveyor with regularly occurring fast travel and pause intervals, each pause interval occurring during the interval in which a conveyor slat is passing over a drop opening, receiving compartments beneath the trackways adapted to cooperate with successive pairs of an upper and a lower drop opening, each such pair of drop openings being of widths aggregating the width of box form desired so that the shooks falling therethrough will be properly assembled in the compartments, and means for adjusting the widths of all of the drop openings simultaneously to adapt the machine for assembling varied sizes of box forms.

43. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, compartments for cooperating with pairs of upper and lower trackway drop openings in receiving pairs of assorted shooks dropped therethrough and assembling them to provide the desired form width, the said lower trackways being positioned outwardly laterally of the positions of the upper trackways, and shifter devices for shifting the box shooks which pass over the upper trackways to travel-alignment with the lower trackways.

44. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, compartments for cooperating with pairs of upper and lower trackway drop openings in receiving pairs of assorted shooks dropped therethrough and assembling them to provide the desired form width, the said lower trackways being positioned outwardly laterally of the positions of the upper trackways, shifter devices for shifting the box shooks which pass over the upper trackways to travel-alignment with the lower trackways, the said shifter devices each including a rearwardly extended arm having an upturned end facilitating upward displacement by a conveyor slot and a cam portion for effecting the shifting action, and being pivoted at its front end to a counterweight, a rock shaft upon which the counterweight is adjustably secured, and being adjustably mounted to adapt the same to the shifting of varied lengths of shooks.

45. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, compartments for cooperating with pairs of upper and lower trackway drop openings in receiving pairs of assorted shooks dropped therethrough and assembling them to provide the desired form width, a floor supported by the front supporting standards on a plane with the lower trackways and onto which the shooks conveyed over the ends of the upper trackways are adapted to fall, means for causing the shooks so conveyed to fall flatly onto said floor, and opposed guide plates for guiding the fall of the shooks off the upper trackway ends, one of said plates being secured to the upper continuous track to move therewith.

46. A machine of the class described comprising upper forward travel trackways and lower rearward travel trackways, said upper and lower trackways each including an inner continuous track and an outer track interrupted by drop openings of widths successively increasing according to the direction of travel of the conveyed box shooks, a slatted conveyor for conveying the shooks over the trackways, compartments for cooperating with pairs of upper and lower trackway drop openings in receiving pairs of assorted shooks dropped therethrough and assembling them to provide the desired form width, means for adjusting the positions of the continuous tracks laterally in like degree throughout their length, adjustable guard rails for preventing upward movement of shooks travelling over the upper trackway and for cooperating with the upper continuous track in guiding the fall of the shooks through the drop openings, and a single guard rail for preventing upward movement of the conveyor slats as they travel rearwardly.

47. A machine as characterized in claim 14 having a duplicate of that structure at the opposite side thereof, and means at each side of the machine for effecting adjustment of all of the drop openings at that side simultaneously and in like degree, each such adjusting means being independent of the other to render possible assembly of end and side forms on the machine at one and the same time.

48. A machine as characterized in claim 14 having a duplicate of that structure at the opposite side thereof, and means at each side of the machine for effecting adjustment of all of the drop openings at that side simultaneously and in like degree, each such adjusting means being independent of the other to render possible assembly of end and side forms on the machine at one and the same time, a single slatted conveyor for conveying the shooks over the trackways of both sides of the machine, a floor supported on a plane with both lower trackways, and a single spring pressed bar for causing the shooks conveyed over and off of the upper trackways to fall flatly onto the said floor.

49. A machine as characterized in claim 14 having a duplicate of that structure at the opposite side thereof, means at each side of the machine for effecting adjustment of the machine for effecting adjustment of all of the drop openings at that side simultaneously and in like degree, each such adjusting means being independent of the other to render possible assembly of end and side forms on the machine at one and the same time, a single slatted conveyor for conveying the shooks over the trackways of both sides of the machine, a floor supported on a plane with both lower trackways, a single spring pressed bar for causing the shooks conveyed over and off of the upper trackways to fall flatly onto the said floor, and a single swingable gate permitting passage of the conveyor slats on their rearward travel but providing passage of a falling shook beyond influence of the said slats.

50. A machine as characterized in claim 14 having a duplicate of that structure at the opposite side thereof, means at each side of the machine for effecting adjustment of the machine for effecting adjustment of all of the drop openings at that side simultaneously and in like degree, each such adjusting means being independent of the other to render possible assembly of end and side forms on the machine at one and the same time, a single slatted conveyor for conveying the shooks over the trackways of both sides of the machine, a floor supported on a plane with both lower trackways, a single spring pressed bar for causing the shooks conveyed over and off of the upper trackways to fall flatly onto the said floor, and a single swingably mounted aligning gate adapted to be engaged by the box shooks prior to passage rearwardly onto the lower trackways to assure perfect alignment thereof with the respective conveyor slats.

51. In a machine of the class described, two sets of ways having provisions for separating the shooks into successive piles of selected sizes, means for conveying the shooks along the ways, compartments for receiving the shooks, said two sets of ways being associated with said compartments whereby each will discharge a shook of a predetermined size into a predetermined compartment thereby selecting shook combinations for predetermined box-form sizes.

52. In a machine of the class described, in combination with a set of compartments for receiving shooks of a plurality of predetermined sizes, means for receiving a plurality of shooks of miscellaneous sizes and conveying them over the compartments and including means for assorting the shooks of various sizes and depositing shooks of a plurality of predetermined sizes in predetermined compartments in separate piles, whereby a shook taken from each pile deposited in a particular compartment when brought together will constitute a box-form of predetermined size.

53. In a machine of the class described, a series of compartments for receiving piles of shooks of different sizes, each compartment adapted to receive shooks of two sizes the aggregate widths of which constitute the width of a box shook form, and means for assorting miscellaneous box shooks and depositing them in the compartments in piles of predetermined sizes and combinations of sizes.

54. In a machine of the class described, means for taking miscellaneous shooks and conveying the same past receiving places, means at the respective receiving places for dropping shooks of predetermined sizes at the receiving places while said conveying means is moving in one direction, and other means for dropping shooks of other predetermined sizes adjacent to the first dropped shooks as the conveyor moves in another direction whereby shooks of complementary sizes will be piled adjacent each other for the purposes specified.

55. In a machine of the class described wherein is provided an assorting way having drop openings; yieldable noses cooperating with said way at the openings to catch an under-sized shook and hold it against dropping through the opening as the shook is passed across the same.

56. In a machine of the class described wherein is provided an assorting way having drop openings; yieldable noses cooperating with said way at the openings to catch an under-sized shook and hold it against dropping through the opening as the shook is passed across the same, said way including cam portions associated with said noses for the purpose specified.

57. A machine of the class described comprising the combination with an assorting way having discharge openings and a conveyor for conveying the shooks along the way, means for driving said conveyor at one speed while the shooks are passing from one opening to another, and for retarding the speed as the shooks approach and pass over the openings.

58. A machine of the class described, an assorting way having a series of drop openings, a conveyor for conveying the shooks along the way and over the drop openings, means for driving said conveyor at a relatively fast speed while the shooks are being moved between adjacent openings, and at a reduced speed when the shooks are passing the openings, and means associated with said driving means for permitting slippage thereof when a shook is excessively retarded at a discharge opening.

59. A machine of the class described, an assorting way having a series of drop openings, a conveyor for conveying the shooks along the way and over the drop openings, means for driving said conveyor at a relatively fast speed while the shooks are being moved between adjacent openings, and at a reduced speed when the shooks are passing the openings, and means associated with said driving means for effecting a yielding action when a shook is excessively retarded at a discharge opening.

60. In a machine of the class described, upper forward travel trackways and lower rearward travel trackways, a conveyor for conveying the shooks along said trackways in succession, each of said trackways having assorting openings of progressively increasing sizes from the entrance toward the exit end of the respective trackways, a series of compartments for receiving the shooks from the assorting openings of the trackways, said trackways being associated with each other and said compartments whereby the largest opening of the lower trackway and the smallest opening of the upper trackway will deposit shooks in the same compartment to make up a box form of distinct size, and whereby there will be a corresponding association between the other openings of the upper and lower trackways and corresponding compartments.

61. In a machine of the class described, means for assorting shooks which includes an assorting way having drop openings of successively increasing sizes, means for conveying the shooks over the way, a series of compartments each cooperative with two assorting openings of complementary sizes whereby each compartment will receive boards of the same aggregate width.

GEORGE ANDREWS SMITH.